(12) United States Patent
Kwon

(10) Patent No.: US 9,076,193 B2
(45) Date of Patent: Jul. 7, 2015

(54) METHOD OF INSPECTING SUBSTRATE

(71) Applicant: Samsung Display Co., Ltd., Yongin (KR)

(72) Inventor: SoonKwan Kwon, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 44 days.

(21) Appl. No.: 14/093,889

(22) Filed: Dec. 2, 2013

(65) Prior Publication Data

US 2015/0003720 A1 Jan. 1, 2015

(30) Foreign Application Priority Data

Jun. 26, 2013 (KR) .................. 10-2013-0073777

(51) Int. Cl.
*G06K 9/00* (2006.01)
*G06T 7/00* (2006.01)

(52) U.S. Cl.
CPC .................... *G06T 7/0004* (2013.01)

(58) Field of Classification Search
CPC .............. G01N 21/95684; G06T 2207/30141; G06T 2207/30148; G06T 7/0002; G06T 7/0004; G06T 7/004; G06T 2207/10016; G06T 2207/10024
USPC ......... 382/147, 145, 151, 152, 153, 199, 201, 382/266, 286, 288, 291
See application file for complete search history.

(56) References Cited

U.S. PATENT DOCUMENTS

| 5,483,603 | A | * | 1/1996 | Luke et al. ............... 382/147 |
| 7,747,063 | B2 | | 6/2010 | Lim et al. |
| 7,860,296 | B2 | | 12/2010 | Kwon et al. |

FOREIGN PATENT DOCUMENTS

| JP | 2009-097959 | 5/2009 |
| JP | 2010-043941 | 2/2010 |
| JP | 2010-117285 | 5/2010 |
| JP | 4910412 | 1/2012 |
| JP | 4964718 | 4/2012 |
| JP | 5071782 | 8/2012 |
| JP | 5077544 | 9/2012 |
| KR | 10-0675890 | 2/2007 |
| KR | 10-0691325 | 3/2007 |
| KR | 10-2008-0041472 | 5/2008 |

* cited by examiner

*Primary Examiner* — Mike Rahmjoo
(74) *Attorney, Agent, or Firm* — H.C. Park & Associates, PLC

(57) ABSTRACT

Provided is a method of inspecting a substrate. The method includes: receiving an image of a pad area of substrate; determining and registering a start point pixel; tracing pixels having the same gradation as the start point pixel; determining a boundary area; designating a direction code to next point pixel on the basis of a current point pixel; extracting maximum distance pixel coordinates; and detecting a defect of the pad area.

12 Claims, 33 Drawing Sheets

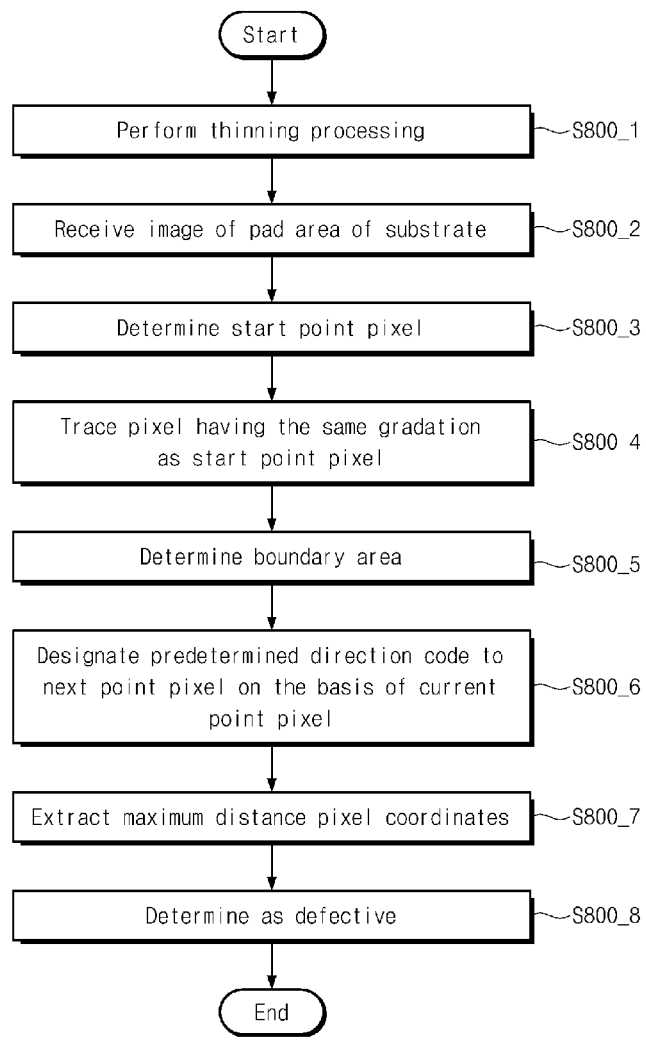

Fig. 23

METHOD OF INSPECTING SUBSTRATE

CROSS-REFERENCE TO RELATED APPLICATIONS

This U.S. non-provisional patent application claims priority under 35 U.S.C. §119 of Korean Patent Application No. 10-2013-0073777, filed on Jun. 26, 2013, the entire contents of which are hereby incorporated by reference.

BACKGROUND

The present disclosure herein relates to a substrate inspecting method, and more particularly, to a substrate inspecting method capable of inspecting a pad area of a substrate.

In general, a liquid crystal display device includes a first substrate where a plurality of pixels are defined, a second substrate facing the first substrate where color filters corresponding to the plurality of pixels are arranged, and a liquid crystal layer between the first substrate and the second substrate. The first substrate may be defined as a thin film transistor substrate or a display substrate. Additionally, the second substrate may be defined as a color filter substrate or a facing substrate.

The thin film transistor substrate includes a plurality of gate lines, a plurality of data lines insulated from and intersecting the gate lines, and a plurality of thin film transistors connected to the gate lines and the data lines in an intersection area of the gate lines and the data lines. The pixels receive pixel voltages through each of the corresponding thin film transistors. Due to the pixel voltages, the arrangement of liquid crystals in a liquid crystal layer changes. According to the changed arrangement of the liquid crystals, light transmittance is adjusted to display an image.

While display panels are manufactured, various inspections are performed to detect defective panels. For example, in order to inspect the pixels of the first substrate, an open/short (OS) test, a visual inspection (VI), and an auto optical inspection (AOI) may be used.

SUMMARY

Exemplary embodiments of the present invention provide a substrate inspecting method capable of effectively inspecting a pad area of a substrate.

Exemplary embodiments of the present invention provide methods of inspecting a substrate, the methods including: receiving an image of a substrate; determining and registering a start point pixel by detecting a gradation change of pixels disposed at a boundary line in an image of a pad area disposed adjacent to a display area of the substrate; sequentially tracing pixels having the same gradation as the start point pixel from the start point pixel and registering the traced pixels; setting an area where the registered pixels are disposed as a boundary area; designating, to the next point pixel, a predetermined direction code corresponding to a direction in which the next point pixel is disposed, on the basis of a current point pixel in the registered pixels of the boundary area; extracting maximum distance pixel coordinates disposed at the maximum distance from the start point pixel by calculating each distance between the start point pixel and a pixel disposed at a conversion point of the direction code and between the start point pixel and an end point pixel registered lastly among the registered pixels; and detecting a defect of the pad area by comparing the maximum distance pixel coordinates with coordinates of the pixels disposed at the boundary line and coordinates of the start point pixel with coordinates of the end point pixel.

In some exemplary embodiments of the present invention, the determining of the start point pixel may include: detecting a gradation change of the pixels disposed at the boundary line as moving on the pixels disposed at the boundary line; and registering a pixel having the gradation change as the start point pixel and initializing a count value.

In some exemplary embodiments of the present invention, the tracing of the pixels may include: comparing gradations of a currently registered pixel and pixels adjacent thereto counterclockwise from a previous point pixel by using the currently registered pixel as an axis; detecting the adjacent pixel having the same gradation as the currently registered pixel, excluding a previously registered pixel; when the adjacent pixel having the same gradation as the currently registered pixel is detected, registering the detected pixel and counting the count value; when the adjacent pixel having the same gradation as the currently registered pixel is not detected, registering the currently registered pixel as an end point pixel; comparing the counting value with a reference value; when the counting value is greater than the reference value, comparing coordinates of the registered pixel with the coordinates of the boundary line pixels; when the counting value is not greater than the reference value, comparing gradations of the currently registered pixel and the adjacent pixel; when the coordinates of the registered pixel are included in the coordinates of the boundary line pixels, registering the registered pixel as the end point pixel; and when the coordinates of the registered pixel are not included in the coordinates of the boundary line pixels, comparing gradations of the registered pixel and the adjacent pixels.

In some exemplary embodiments of the present invention, the designating of the direction code may include: setting an 8-direction chain code extending radially with the same interval; and designating, as the 8-direction chain code, a direction in which the next point pixel on the basis of the current point pixel in the sequentially registered pixels.

In some exemplary embodiments of the present invention, the extracting of the maximum distance pixel coordinates may include: calculating a distance between the start point pixel and a pixel of a conversion point of the 8-direction chain code and a distance between the start point pixel and the end point pixel; and extracting coordinates of the maximum distance pixel by comparing the calculated distances.

In some exemplary embodiments of the present invention, the detecting of the defect of the pad area may include: comparing the coordinates of the maximum distance pixel with the coordinates of the boundary line pixels; when the coordinates of the maximum distance pixel are included in the coordinates of the boundary line pixels, determining the boundary area as normal; and when the coordinates of the maximum distance pixel are not included in the coordinates of the boundary line pixels, determining the boundary area as defective.

In some exemplary embodiments of the present invention, the determining of the boundary area as defective may include: comparing the coordinates of the start point pixel with the coordinates of the end point pixel; when the start point pixel is disposed adjacent to the end point pixel, determining the boundary area as open defective; and when the start point pixel is not disposed adjacent to the end point pixel, determining the boundary area as short defective.

In some exemplary embodiments of the present invention, the substrate may include: a plurality of pixel units disposed in the display area and connected to gate lines and data lines intersecting each other; and a plurality of data pads disposed in the pad area, a plurality of connection wires connected to corresponding data lines, and a plurality of data pads connected to corresponding connection wires, wherein the connection wires may extend downwardly by a predetermined distance with the same interval and may extend radially to connect to the corresponding data lines.

In some exemplary embodiments of the present invention, the connection wires and the data pads in the image of the pad area may be displayed as pixels having a first gradation with predetermined first brightness levels and an area where the connection wires and the data pads are not disposed may be displayed as pixels having a second gradation lower than the first gradation with predetermined second brightness levels.

In some exemplary embodiments of the present invention, the methods may further include: capturing an image of the substrate and thinning the captured image of the substrate to provide the thinned image as an image of the substrate; wherein the thinning of the captured image may include: displaying an area where the connection wires and the data pads are disposed as pixels having a first gradation with one brightness level and displaying an area where the connection wires and the data pads are not disposed as pixels having a second gradation lower than the first gradation with another brightness level.

In some exemplary embodiments of the present invention, the methods may further include: receiving the image of the display area; setting an inspection area in the display area; inspecting and determining a pixel period security by dividing the pixel units of the inspection area by a predetermined number unit; when the pixel period security is determined, inspecting an interval between the pixel units of the pixel period; when the pixel period security is not determined, proceeding to the dividing the inspection area and the setting of the inspection area; when the interval between the pixel units is the same, detecting a defective pixel unit by comparing images of the pixel units; and when the interval between the pixel units is different, proceeding to the dividing of the inspection area and the setting of the inspection area.

In some exemplary embodiments of the present invention, the inspecting and determining of the pixel period security may include: dividing the pixel units of the inspection area by a pixel period defined by a predetermined pixel number; when the number of the pixel units is divided by the pixel period, determining it as the pixel period security; and when the number of the pixel units is not divided by the pixel period, not determining it as the pixel period security.

In some exemplary embodiments of the present invention, provided are methods of inspecting a substrate, the methods including: performing a thinning operation to capture an image of the substrate and display the captured image of the substrate as two gradations with different brightness; receiving the thinned image of the substrate; determining and registering a start point pixel by detecting a gradation change of pixels disposed at a boundary line in an image of a pad area disposed adjacent to a display area of the substrate; sequentially tracing pixels having the same gradation as the start point pixel from the start point pixel and registering the traced pixels; setting an area where the registered pixels are disposed as a boundary area; extracting maximum distance pixel coordinates disposed at a maximum distance from the start point pixel by calculating each distance between the start point pixel and the registered pixels of the boundary area; and detecting a defect of the pad area by comparing the maximum distance pixel coordinates with coordinates of the pixels disposed at the boundary line and coordinates of the start point pixel with coordinates of the end point pixel.

In some exemplary embodiments of the present invention, the substrate may include: a plurality of pixel units disposed in the display area and connected to gate lines and data lines intersecting each other; and a plurality of data pads disposed in the pad area, a plurality of connection wires connected to corresponding data lines, and a plurality of data pads connected to corresponding connection wires.

In some exemplary embodiments of the present invention, the performing of the thinning operation may include displaying an area where the connection wires and the data pads are disposed as pixels having a first gradation with one brightness level and displaying an area where the connection wires and the data pads are not disposed as pixels having a second gradation lower than the first gradation with another brightness level.

In some exemplary embodiments of the present invention, the determining of the start point pixel may include: detecting a gradation change of the pixels disposed at the boundary line as moving on the pixels disposed at the boundary line; and registering a pixel having the gradation change as the start point pixel and initializing a count value.

In some exemplary embodiments of the present invention, the tracing of the pixels may include: comparing gradations of a currently registered pixel and pixels adjacent thereto counterclockwise from a previous point pixel by using the currently registered pixel as an axis; detecting the adjacent pixel having the same gradation as the currently registered pixel, excluding a previously registered pixel; when the adjacent pixel having the same gradation as the currently registered pixel is detected, registering the detected pixel and counting the count value; when the adjacent pixel having the same gradation as the currently registered pixel is not detected, registering the currently registered pixel as an end point pixel; comparing the counting value with a reference value; when the counting value is greater than the reference value, comparing coordinates of the registered pixel with the coordinates of the boundary line pixels; when the counting value is not greater than the reference value, comparing gradations of the currently registered pixel and the adjacent pixel; when the coordinates of the registered pixel are included in the coordinates of the boundary line pixels, registering the registered pixel as the end point pixel; and when the coordinates of the registered pixel are not included in the coordinates of the boundary line pixels, comparing gradations of the registered pixel and the adjacent pixels.

In some exemplary embodiments of the present invention, the extracting of the maximum distance pixel coordinates may include: calculating a distance between the start point pixel and a pixel of a conversion point of the 8-direction chain code and a distance between the start point pixel and the end point pixel; and extracting coordinates of the maximum distance pixel by comparing the calculated distances.

In some exemplary embodiments of the present invention, the detecting of the defect of the pad area may include: comparing the coordinates of the maximum distance pixel with the coordinates of the boundary line pixels; when the coordinates of the maximum distance pixel are included in the coordinates of the boundary line pixels, determining the boundary area as normal; and when the coordinates of the maximum distance pixel are not included in the coordinates of the boundary line pixels, determining the boundary area as defective.

In some exemplary embodiments of the present invention, the determining of the boundary area as defective may include: comparing the coordinates of the start point pixel with the coordinates of the end point pixel; when the start point pixel is disposed adjacent to the end point pixel, determining the boundary area as open defective; and when the start point pixel is not disposed adjacent to the end point pixel, determining the boundary area as short defective.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 22 is a flowchart illustrating a method of inspecting a pad area of a substrate according to another embodiment of the inventive concept;

FIG. 23 illustrates a thinning processing operation of FIG. 22;

DETAILED DESCRIPTION OF THE ILLUSTRATED EMBODIMENTS

Hereinafter, exemplary embodiments of the inventive concept will be described in detail with reference to the accompanying drawings.

Figure 1:
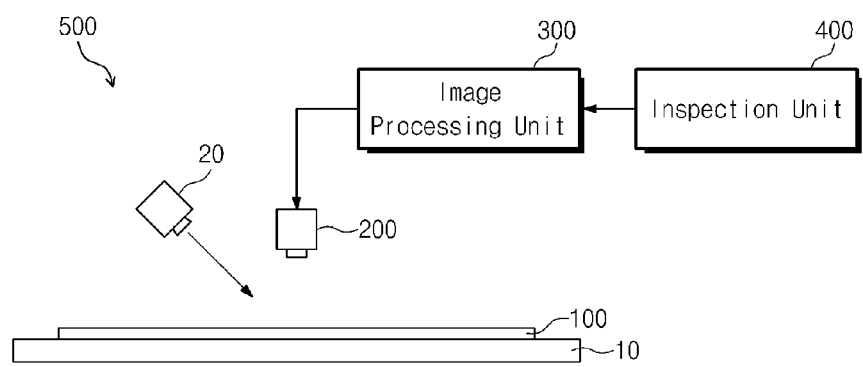
FIG. 1 is a side view of a substrate inspecting device according to an embodiment of the inventive concept.

FIG. 1 is a side view of a substrate inspecting device according to an embodiment of the inventive concept.

Referring to FIG. 1, the substrate inspecting device 500 includes a stage 10, a substrate 100, a lighting unit 20, an image capturing unit 200, an image processing unit 300, and an inspection unit 400.

The substrate 100 seats on the stage 10. The substrate 100 may be defined as a thin film transistor substrate or a display substrate.

The lighting unit 20 provides light to the substrate 100. However, the inventive concept is not limited thereto, and a backlight unit supplying light to the substrate 100 may be disposed at the bottom of the substrate 100

The image capturing unit 200 captures images of pixel units disposed on the substrate and images of wires connected to the pixel units. The images captured by the image capturing unit 200 are provided to the image processing unit 300. The image capturing unit 200 may include a high-resolution charge couple device (CCD) camera.

The image processing unit 300 converts the images provided from the image capturing unit 200 into digital signals. The digital signals converted by the image processing unit 300 are provided to the inspection unit 400 as image information.

The inspection unit 400 receives the image information of the converted digital signals from the image processing unit 300. The inspection unit 400 inspects whether the substrate 100 is defective on the basis of the image information. A substrate inspecting method performed by the inspection unit 400 will be described in more detail below.

Figure 2:
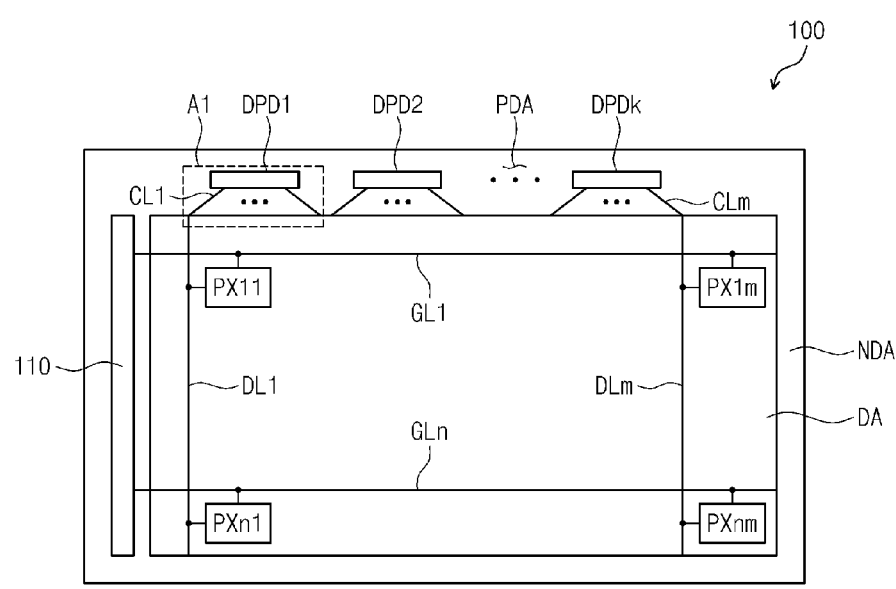
FIG. 2 is a plan view of the substrate of FIG. 1.

FIG. 2 is a plan view of the substrate 100 of FIG. 1.

Referring to FIG. 2, the substrate includes a plurality of gate lines GL1 to GLn, a plurality of data lines DL1 to DLm, a plurality of pixel units PX11 to PXnm, a plurality of data pad units DPD1 to DPDk, and a plurality of connection wires CL1 to CLm.

An area on a plane of the substrate 100 may include a display area DA and a non-display area NDA around the display area DA.

The gate lines GL1 to GLn and the data lines DL1 to DLm are insulated from each other and interest in the display area DA of the substrate 100. m and n are integers greater than 0. The pixel units PX11 to PXnm in the display area DA are disposed in an area where the gate lines GL1 to GLn and the data lines DL1 to DLm intersect. The pixel units PX11 to PXnm may be arranged in a matrix of n rows and m columns intersecting each other.

The non-display area adjacent to the top of the display area DA may be defined as a pad area PDA. The data pad units DPD1 to DPDk and the connection sires CL1 to CLm may be disposed in the pad area PDA. k is an integer greater than 0 and less than m. The data pad units DPD1 to DPDk are connected to the connection wires CL1 to CLm of each corresponding predetermined number.

The connection wires CL1 to CLm are disposed between the data pad units DPD1 to DPDk and the data lines DL1 to DLm to electrically connect the data pad unit DPD1 to DPDk and the data lines DL1 to DLm. The connection wires CL1 to CLm are connected to corresponding data lines DL1 to DLm, respectively.

Although not shown in the drawings, corresponding source driving chips (not shown) are connected to the data pad units DPD1 to DPDk, respectively. Data voltages are provided from the source driving chips to the data pad units DPD1 to DPDk. Data voltages are provided to the pixel units PX11 to PXnm through the connection wires CL1 to CLm connected to the data pad units DPD1 to DPDk and the data lines DL1 to DLm connected to the connection wires CL1 to CLm.

A gate driving unit 110 providing gate signals to the pixel units PX11 to PXnm may be disposed in the display area NDA adjacent to the display area DA. The gate driving unit 110 may be mounted in an amorphous silicon TFT gate driver circuit (ASG) form.

The gate driving unit 110 provides gate signals to the pixel units PX11 to PXnm through the gate lines GL1 to GLn. The gate signals are sequentially provided to the pixel units PX11 to PXnm by each row unit. The pixel units PX11 to PXnm receive data voltages in response to the gate signals and display gradation corresponding to the data voltages.

Figure 3:
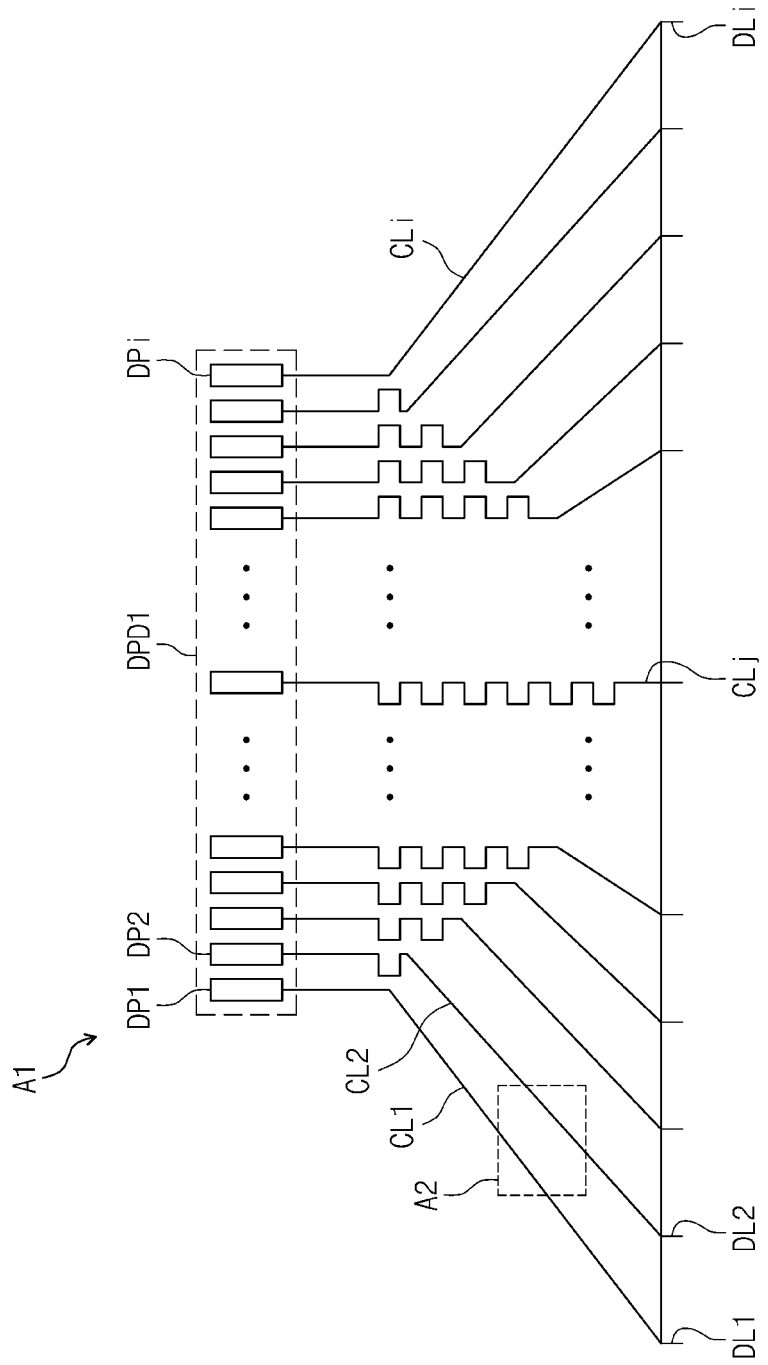
FIG. 3 is an enlarged view of a first area of FIG. 2.

FIG. 3 is an enlarged view of a first area of FIG. 2.

The data pad unit DPD1 to DPDk may be defined as first to k data pad units DPD1 to DPDk according to the arranged order. Therefore, the data pad unit DPD1 shown in FIG. 3 is defined as the first data pad unit DPD1.

Referring to FIG. 3, a predetermined number of the connection wires CL1 to CLi are connected to the first data pad unit DPD1. For example, the first data pad unit DPD1 is connected to i connection wires CL1 to CLi. i is an integer greater than 1 and less than m. Additionally, the connection wires CL1 to CLi are connected to corresponding i data lines CL1 to DLi.

The connection wires CL1 to CLi and the data lines DL1 to DLi are defined as the first to i connection wires CL1 to CLi and the first to i data lines DL1 to DLi according to the arranged order.

The first data pad unit DPD1 includes the plurality of data pads DP1 to Dpi connected to the corresponding first to i connection wires CL1 to CLi. The data pads DP1 to Dpi are defined as the first to i data pads DPD1 to Dpi according to the arranged order. Although not shown in the drawings, the second to k data pad units DPD2 to DPDk include data pads connected to the corresponding i connection wires.

The first to i connection wires CL1 to CLi connected to the first to i data pads DP1 to DPi extend by a predetermined distance downwardly at the same intervals. The first to i connection wires CL1 to CLi extending by a predetermined distance downwardly extend in a radial form to connect to the corresponding first to i data lines DL1 to DLi.

In more detail, the first to i connection wires CL1 to CLi extend in a straight line form by a predetermined distance downwardly. The first to i connection wires CL1 to CLi extending by a predetermined distance downwardly curve to the left and the right at a predetermined angle to have a straight line form and extend to connect to the corresponding first and i data lines DL1 to DLi.

The second to i-1 connection wires CL2 to CLi-1 except for the first and i connection wires CL1 and CLi extend in a straight line form by a predetermined distance downwardly. The second to i-1 connection wires CL2 to CLi-1 extending by a predetermined distance downwardly extend in a square wave form downwardly.

The lengths of the second to i-1 connection wires CL2 to CLi-1 having the square wave form are formed longer as they approach a center connection wire CLj at the center. Additionally, as shown in FIG. 3, the square wave form may be formed to have an inverted triangle area.

The center connection wire CLj among the second to i-1 connection wires CL2 to CLi-1 extends in a square wave form and then extend in a straight line form downwardly to connect to a corresponding data line. The second to j-1 and j+1 to i-1 connection wires CL2 to CLj-1 and CLj+1 to CLi-1 except for the center connection wire CLKj extend in a square wave form and then curve at a predetermined angle in a straight line form to radially extend.

The first to i connection wires CL1 to CLi extend radially to connect to the corresponding first to i data lines DL1 to DLi. That is, an angle at which the first to i connection wires CL1 to CLi curve becomes smaller on the basis of the bottom direction as they approach the center.

The angle at which the first and i connection wires CL1 to CLi among the first to i connection wires CL1 to CLi curve on the basis of the bottom direction is the largest. Additionally, an angle at which the center connection wire curves on the basis of the bottom direction is 0°.

The entire first to i connection wires CL1 to CLi may have a straight line form. In this case, since the first to i connection wires CL1 to CLi extend radially, the lengths of the first to i connection wires CL1 to CLi become shorter as they approach the center. However, the lengths of the second to i-1 connection wires CL2 to CLi-1 having the square wave form become longer as they approach the center. Accordingly, the lengths of the first to i connection lines CL1 to CLi become substantially identical to each other by the second to i-1 connection wires CL2 to CLi-1 having the square wave form.

Resistance is proportional to length. Since the lengths of the first to i connection wires CL1 to CLi are set to be substantially identical to each other, the resistances of the first to i connection wires CL1 to CLi may be set to be identical. Accordingly, equipotential lines may be formed on the first to i connection wires CL1 to CLi.

Figure 4:
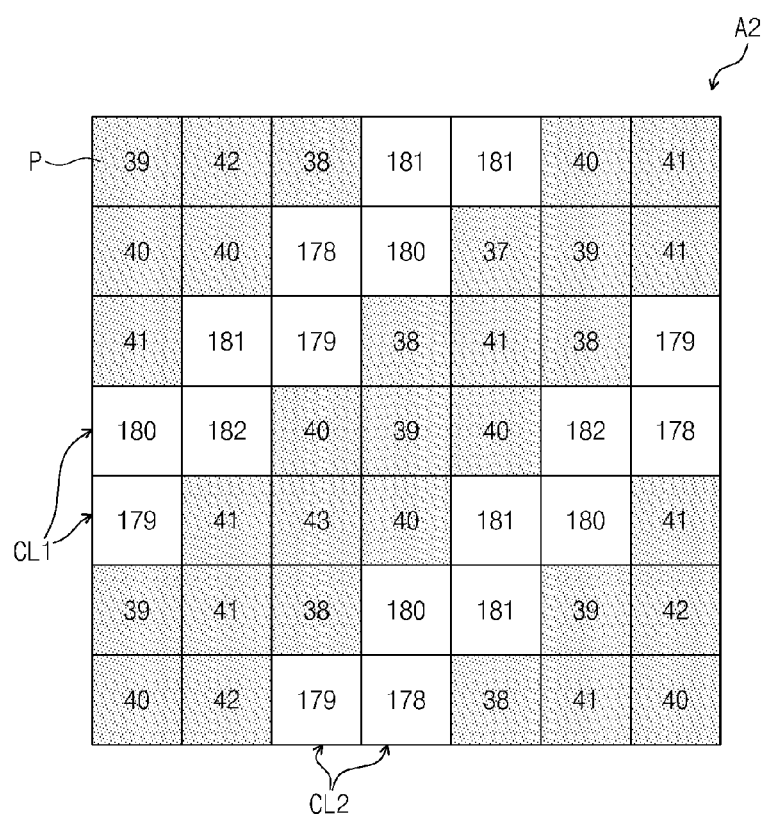
FIG. 4 is a view illustrating an image processing status of a second area of FIG. 3.

FIG. 4 illustrates an image processing status of a second area of FIG. 3.

Referring to FIG. 4, images of a pad area PDA captured by the image capturing unit 200 are processed in the image processing unit 300 to be displayed as a plurality of pixels P. For example, as shown in FIG. 4, an image of the second area A2 of the pad area PDA may be displayed as 7×7 pixels P. However, the inventive concept is not limited thereto and the second area A2 may be displayed by more pixels.

An area where the first and second connection wires CL1 and CL2 are disposed may be displayed as pixels P having a first gradation including a predetermined first brightness step. An area where no first and second connection wires CL1 and CL2 are disposed may be displayed as pixels P having a gradation lower than a first gradation and a second gradation including predetermined second brightness steps.

In this exemplary embodiment of the present invention, the gradation is divided into gradations having 0 to 255 brightness steps. The first brightness step includes 175 to 185 brightness steps. Additionally, the second brightness step includes 35 to 45 brightness steps. That is, the first gradation includes 175 to 185 brightness steps and the second gradation includes 35 to 45 brightness steps. However, any number of brightness steps can be used, so long as they can be discerned by inspection unit 400. For convenience of description, pixels having the first gradation are displayed as white color and pixels having the second gradation are displayed as gray, as shown in FIG. 4.

For convenience of description, the second area A2 is displayed as a portion of the pad area PDA as shown in FIG. 4, but other areas may be displayed similarly. For example, an area where the first to i data pads DP1 to Dpi and the first to m connection wires CL1 to CLm of each of the first to k data pad units DPD1 to DPDk in the pad area PDA are disposed may be displayed as pixels having the first gradation. Additionally, areas where the first to i data pads DP1 to Dpi and the first to m connection wires CL1 to CLm of each of the first to k data pad units DPD1 to DPDk in the pad area PDA are not disposed may be displayed as pixels having the second gradation.

Hereinafter, for convenience of description, numerical values for brightness steps of gradations in the pixels P where an image of the second area A2 is displayed are omitted.

Figure 5:
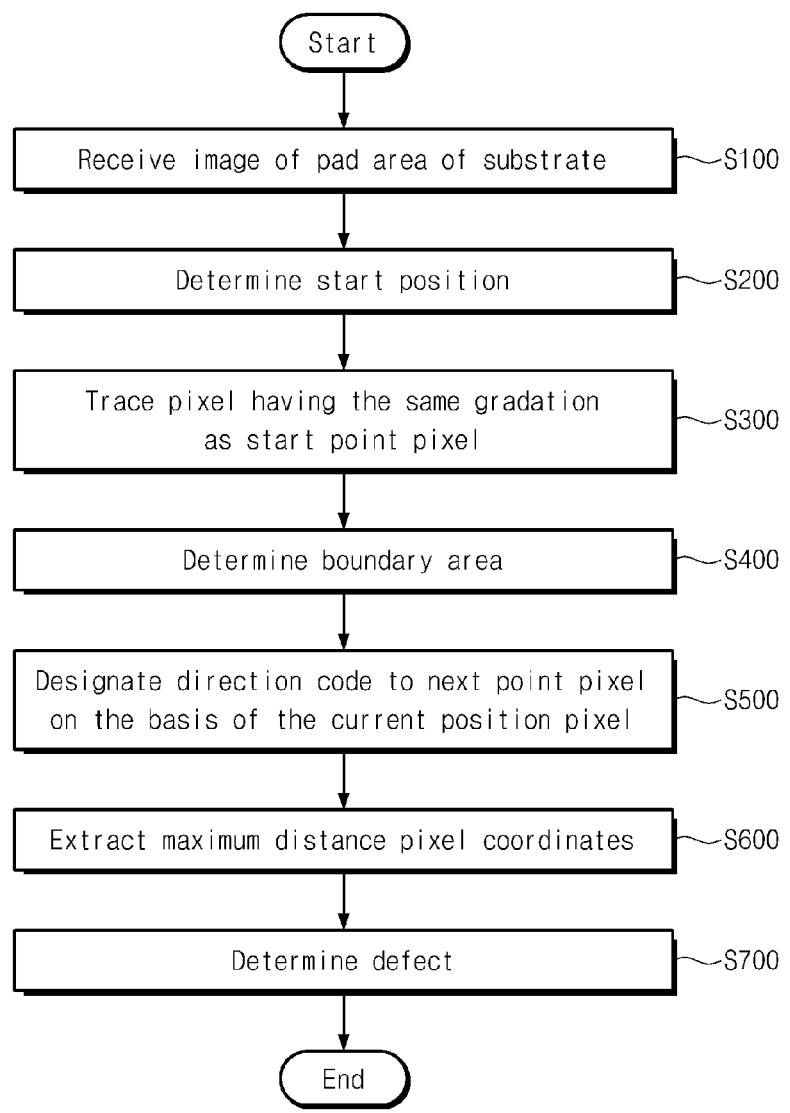
FIG. 5 is a flowchart illustrating a method of inspecting a pad area of the substrate of FIG. 2.

FIG. 5 is a flowchart illustrating a method of inspecting a pad area of the substrate 100 of FIG. 2.

Referring to FIG. 5, the inspection unit 400 receives an image of the pad area PDA of the substrate 100 from the image processing unit 300. The inspection unit 400 inspects whether the pad area PDA is defective by using image information of the pad area PDA.

Hereinafter, exemplarily, a method of inspecting pixels P where an image is displayed will be described. However, the entire pad area PDA may be substantially inspected through the same inspection method.

In operation S100, an image of the second area A2 in the pad area PDA of the substrate 100 is provided. In operation S200, a start point pixel is determined and registered by detecting a gradation change of pixels disposed at the boundary line of the provided image. The boundary line pixels are defined as pixels disposed at the boundary of an inspection area.

In operation S300, pixels having the same gradation as the start point pixel are sequentially traced from the start point pixel and registered. An 8-direction gradation tracing method may be used as a gradation tracing method. A detailed description of the 8-direction gradation tracing method will be made later. The last registered pixel is registered as an end point pixel.

In operation S400, an area where registered pixels are disposed is set to a boundary area. Accordingly, the boundary area includes pixels having the same gradation. In operation S500, a predetermined direction code corresponding to a direction in which the next point pixel is disposed on the basis of a current point pixel in the pixels in the boundary area is designated to the next point pixel. An 8-direction chain code may be used as the predetermined direction code. A detailed description of the 8-direction chain code will be made later.

In operation S600, the maximum distance pixel coordinates are extracted. For example, each distance between the start point pixel and a pixel disposed at a conversion point of a direction code and between the start point pixel and the end point pixel is calculated, so that the maximum distance pixel coordinates spaced the maximum distance apart from the start point pixel are extracted.

In operation S700, by comparing the coordinates of the maximum distance pixel with the coordinates of the pixels disposed at the boundary line and also the coordinates of the start point pixel with the coordinates of the end point pixel, it is determined whether the second area A2 is is defective.

Hereinafter, operations of the method (i.e., operation S200 to operation S700) of inspecting a pad area by using an image of the second area A2 of FIG. 4 will be described in detail.

Figure 6:
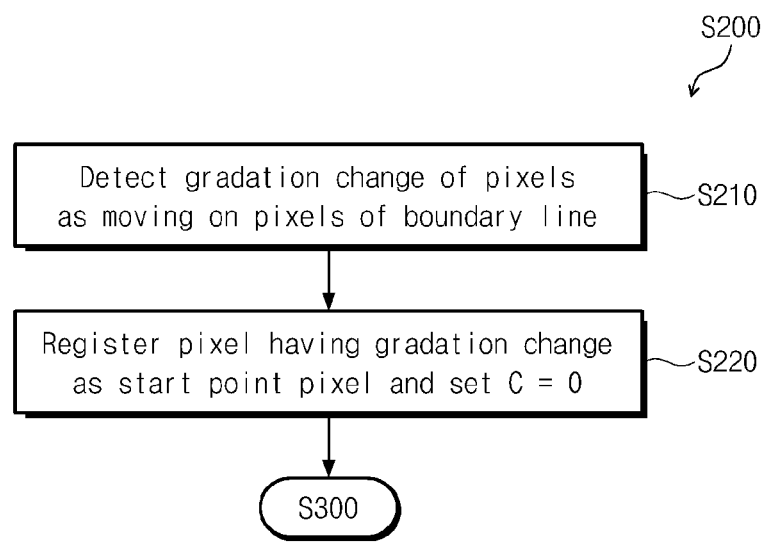
FIG. 6 is a flowchart illustrating a method of determining a start point pixel of FIG. 5.
Figure 7:
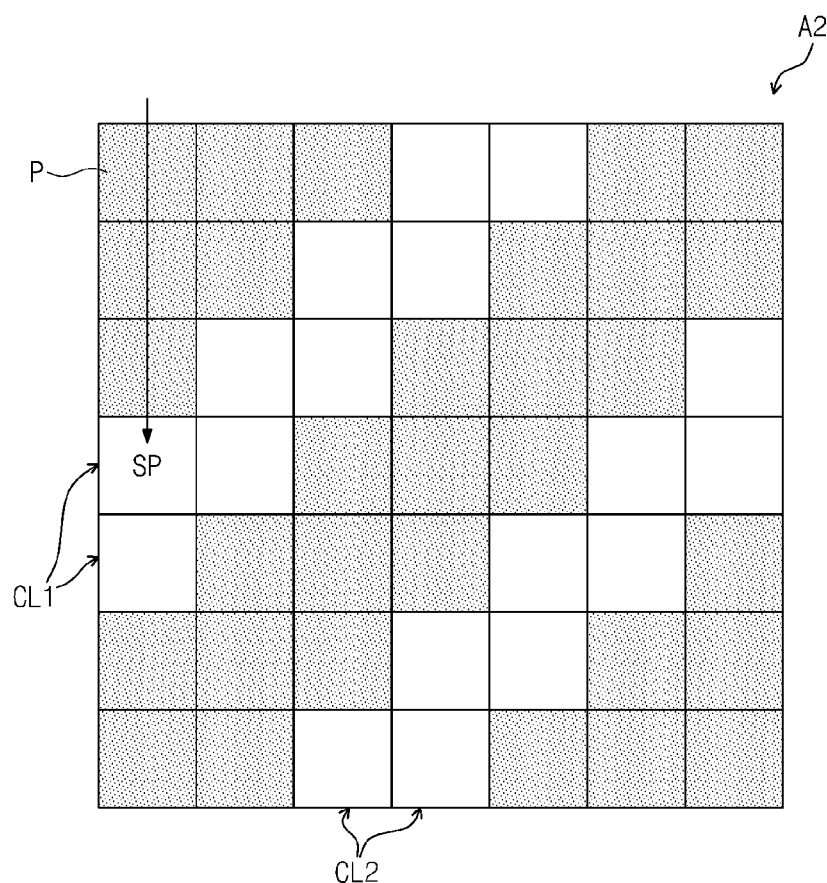
FIG. 7 illustrates a method of determining a start point pixel by using an image of a second area.

FIG. 6 is a flowchart illustrating a method of determining a start point pixel of FIG. 5. FIG. 7 is a view illustrating a method of determining a start point pixel by using an image of a second area.

The image of the second area A2 of FIG. 7 is identical to the image of the second area A2 of FIG. 4. That is, in relation to an inspection method, determining a start point pixel by using the image of the second area A2 of FIG. 4 (i.e., operation S200) is described.

Referring to FIGS. 6 and 7, a gradation change of the pixels P disposed at the boundary line is detected as it approaches from the pixels P disposed at the boundary line of the second area A2 toward a predetermined direction. For example, a gradation change of the pixels P is detected as it approaches from the pixel P disposed at the top among the pixels disposed at the leftmost of the second area A2 toward the bottom direction.

After a gradation change of the pixels P at the boundary line is detected in the top-down direction, a gradation change of the pixels P is detected from the pixel P disposed at the left among the pixels P disposed at the lowermost of the second area A2 toward the right direction.

When a gradation change of the pixels P is detected from the pixel disposed at the top among the pixels disposed at the leftmost toward the bottom direction, a second gradation is detected first by the pixels P having the second gradation. After the second gradation is detected, a first gradation is detected at the pixel P in an area where the first wire CL1 is disposed.

In operation S200, a pixel SP having a changed gradation is registered as the start point pixel SP. A counting value C is reset to 0, and the determining of the start point pixel is completed in operation S200

The second area A2 is exemplarily described, but an image of the pad area PDA may be substantially displayed as the pixels P. Accordingly, since a gradation change of the pixels P is detected from the pixels P disposed at the boundary line of the pad area PDA toward a predetermined direction, the determining of the start point pixel may be performed in operation S210 and operation S220.

Figure 8:
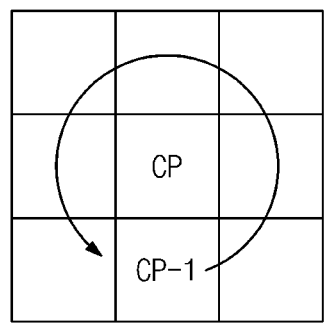
FIG. 8 illustrates an 8-direction gradation tracing method.

FIG. 8 illustrates an 8-direction gradation tracing method.

Referring to FIG. 8, the 8-direction gradation tracing method is defined as a method of comparing gradations of a current pixel CP and pixels adjacent thereto counterclockwise from a previous point pixel CP−1 by using the current pixel CP as an axis. Once a pixel having the same gradation as the current pixel CP is found, the same operation repeats on the basis of the found pixel.

Figure 9:
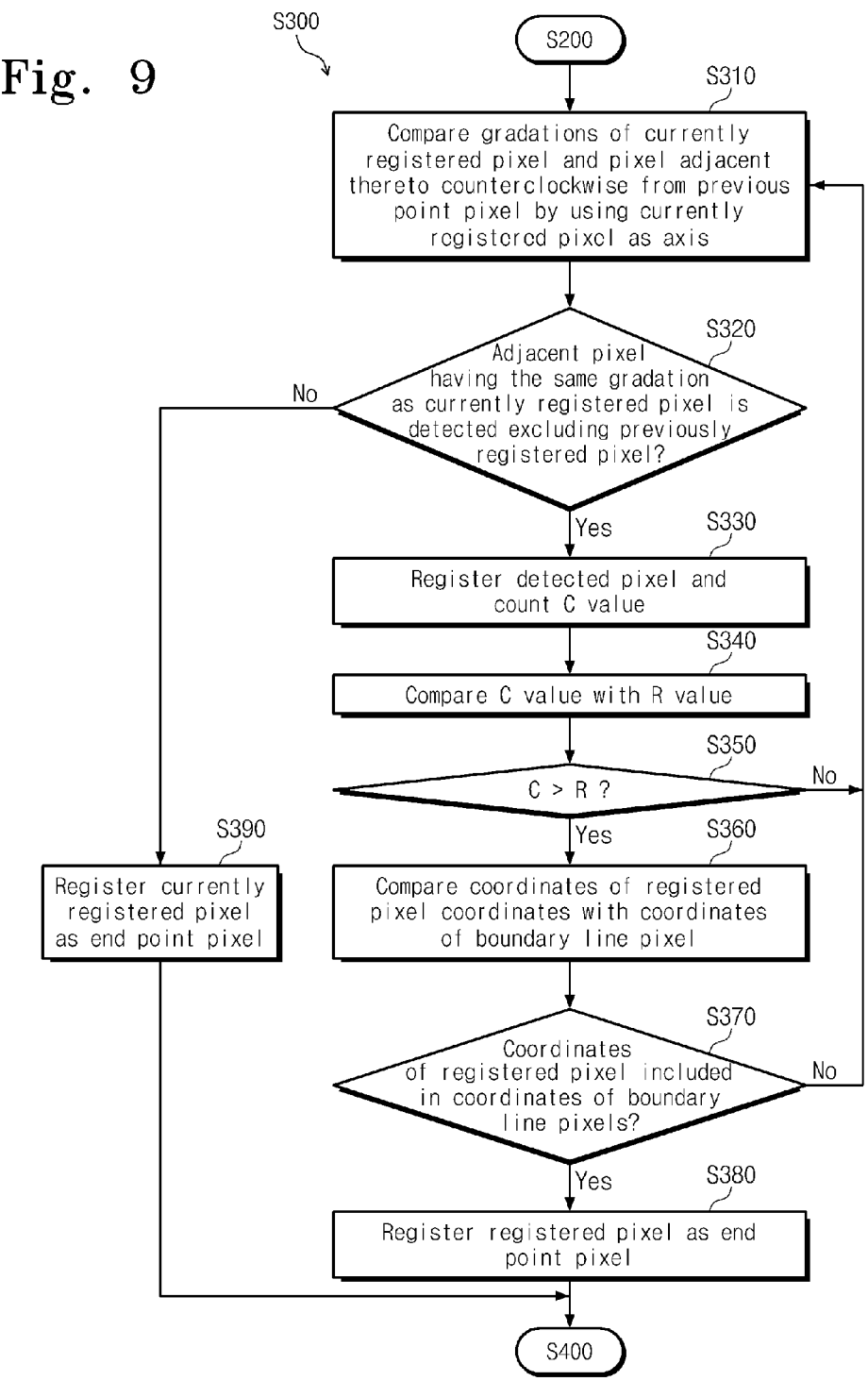
FIG. 9 is a flowchart illustrating a method of tracing a pixel having the same gradation as the start point pixel of FIG. 5.

FIG. 9 is a flowchart illustrating a method of tracing a pixel having the same gradation as the start point pixel of FIG. 5. FIGS. 10A to 10D are views illustrating a pixel tracing method in a normal connection wire. FIGS. 11A and 11B are views illustrating a pixel tracing method in a defective connection wire.

An image of a second area A2 shown in FIGS. 10A to 10D is identical to the image of the second area A2 shown in FIG. 2. additionally, the image of the second area A2 shown in FIGS. 10A to 10D illustrates an image of the first and second connection wires CL1 and CL2 in a normal status.

FIG. 11A is a view illustrating an image of the first connection wire CL1 in an open defective status in the image of the second area A2 of FIG. 4. FIG. 11B is a view illustrating an image of the first connection wire CL1 in a short defective status in the image of the second area A2 of FIG. 4. That is, a pixel tracing operation (i.e., operation S300) is described using the image of the second area A2 of FIG. 4.

Figure 10A:
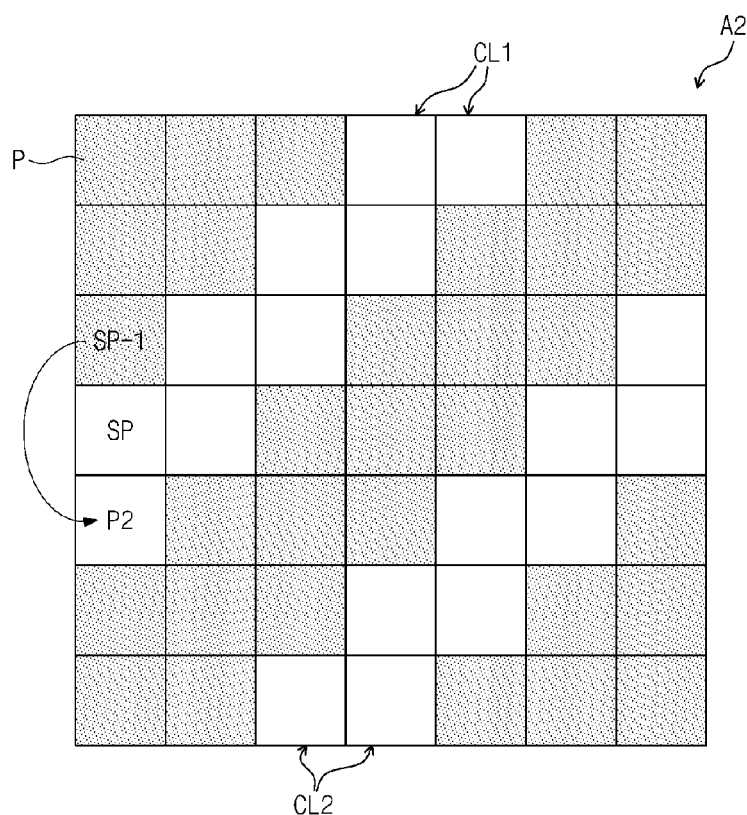
FIGS. 10A to 10D illustrate a pixel tracing method in a normal connection wire.
Figure 11A:
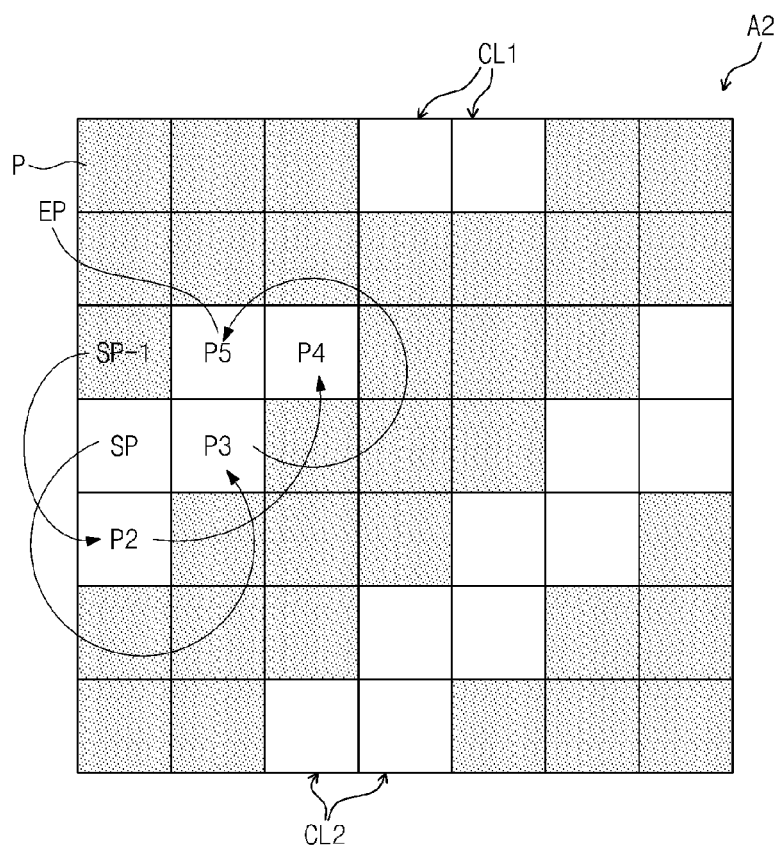
FIGS. 11A and 11B illustrate a pixel tracing method in a defective connection wire.
Figure 11B:
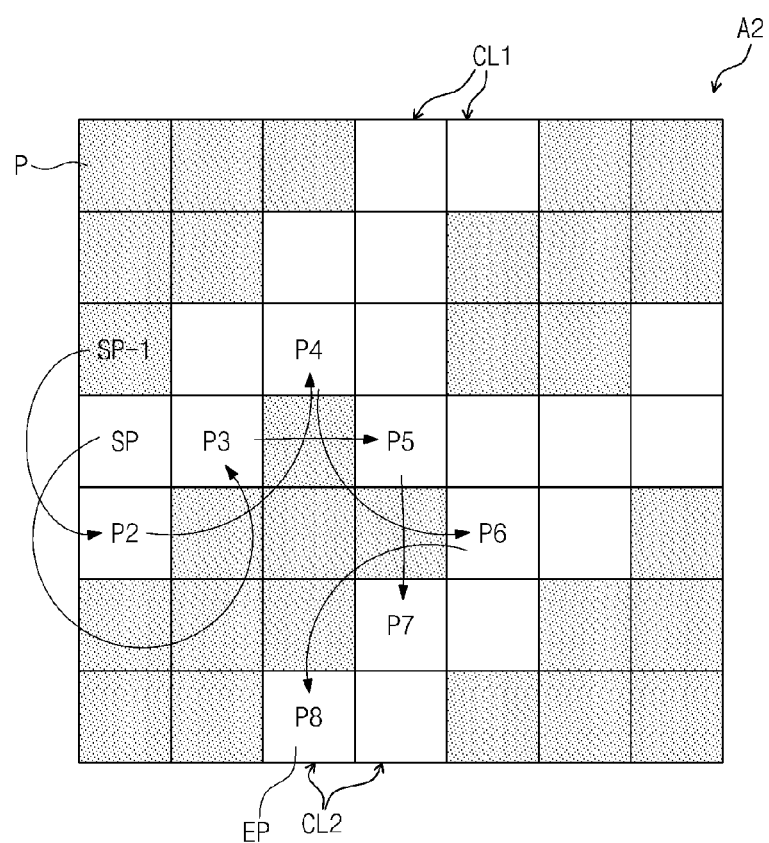

Referring to FIGS. 9 and 10A, gradations of a currently registered pixel and pixels adjacent thereto are compared counterclockwise from a previous point pixel by using the currently registered pixel in operation S310.

The pixel registered in this stage is a start point pixel SP. As mentioned above, a gradation change of the pixels P is detected from the pixel disposed at the top among the pixels P disposed at the leftmost of the second area A2 toward the bottom direction. Accordingly, the pixel placed third from the top among the pixels P disposed at the leftmost of the second area A2 is a previous point pixel SP-1 of the start point pixel SP.

In operation S310, gradations of the start point pixel SP and pixels P adjacent thereto are compared counterclockwise from the previous point pixel SP-1 by using the currently registered start point pixel SP as an axis.

In operation S320, except for a previously registered pixel, an adjacent pixel having the same gradation as a currently registered pixel is detected. There is no previously registered pixel, and the currently registered pixel is a start point pixel SP. The start point pixel SP has a first gradation. Accordingly, as rotating counterclockwise from the previous point pixel SP-1, a second pixel P2 disposed at the bottom of the start point pixel SP and having a first gradation is detected as an adjacent pixel having the same gradation as the currently registered start point pixel SP.

When an adjacent pixel having the same gradation as a registered pixel is detected, the detected pixel is registered and a counting value C is counted in operation S330. since the second pixel P2 having the same gradation as the start point pixel SP is detected, the second pixel P2 is registered and the counting value C is counted as 1 in operation S330.

In operation S340, the counting value C and a reference value R are compared. The reference value R may be set to 1. In operation S350, it is tested whether the counting value C is greater than the reference value R. Since the current counting value C is 1, if the reference value R is set to 1, the counting value C is not greater than the reference value R. When the counting value C is not greater than the reference value R, the method proceeds to operation S310.

When the counting value C is not used, the coordinates of the second pixel P2 are included in the coordinates of boundary line pixels in operation S360 and operation S370. Accordingly, the second pixel P2 is registered as the end point pixel in operation S380, and the pixel tracing operation (i.e., operation S300) is terminated. However, when the counting value C is greater than 1 (i.e., the reference value R), since the method proceeds to operation S360, even if the second pixel P2 is registered, the gradation tracing operation (i.e., operation S300) is not terminated.

Since the first connection wire CL1 is displayed as two pixels P having the first gradation in a column direction in the second area A2, the reference value R is set to 1 according to an embodiment to the inventive concept. However, the inventive concept is not limited thereto, and thus the reference value R may vary. For example, when the first connection wire CL1 is displayed as three pixels P having the first gradation in a column direction in the second area A2, the reference value R may be set to 2.

Figure 10B:
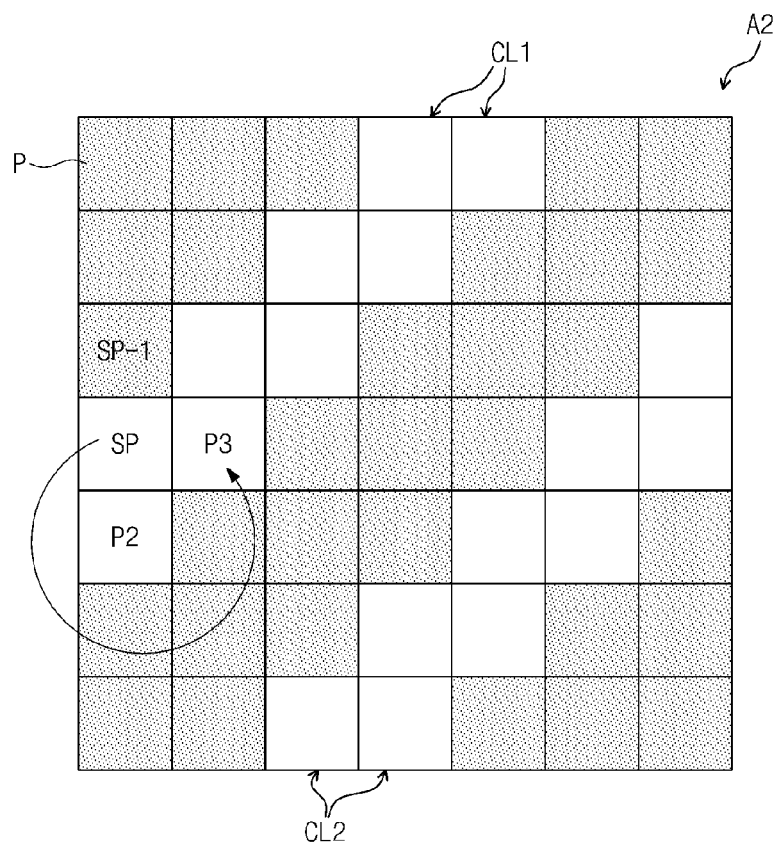

Referring to FIGS. 9 and 10B, since the second pixel is registered and the counting value C is less than the reference value R, the method proceeds to operation S310.

The currently registered pixel P2 is the second pixel P2. A previous point pixel SP of the second pixel P2 is the start point pixel SP. Accordingly, in operation S310, gradations of the currently registered second pixel P2 and pixels P adjacent thereto are compared counterclockwise from the start point pixel SP by using the currently registered second pixel P2 as an axis.

A previously registered pixel is a start point pixel SP in this stage. In operation S320, except for the previously registered start point pixel SP, an adjacent pixel having the same gradation as the currently registered second pixel P2 is detected. Accordingly, except for the start point pixel SP, as rotating counterclockwise from the start point pixel SP, a third pixel P3 disposed at the right of the start point pixel SP and having the first gradation is detected as an adjacent pixel having the same gradation as the second pixel P2.

In operation S330, the detected third pixel P3 is registered and the counting value is counted as 2. The counting value C and the reference value R are compared in operation S340. Since the current counting value C is 2, when the reference value R is set to 1, the counting value C is greater than the reference value R.

In operation S350, it is tested whether the counting value C is greater than the reference value R. Since the counting value C is greater than the reference value R, the registered pixel coordinates and the coordinates of the boundary line pixels are compared in operation S360. Since the pixel P3 registered in this stage is the third pixel P3, the coordinates of the third pixel P3 and the coordinates of the boundary line pixels are compared in operation S360.

In operation S370, it is determined whether the coordinates of the registered pixel is are included in the coordinates of the boundary line pixels. Since the pixel P3 registered in this stage is the third pixel P3, it is tested whether the coordinates of the third pixel P3 are included in the coordinates of the boundary line pixels. The third pixel P3 is not included in the boundary line pixels. When the coordinates of the currently registered third pixel P3 are not included in the coordinates of the boundary line pixels, the method proceeds to operation S310.

Figure 10C:
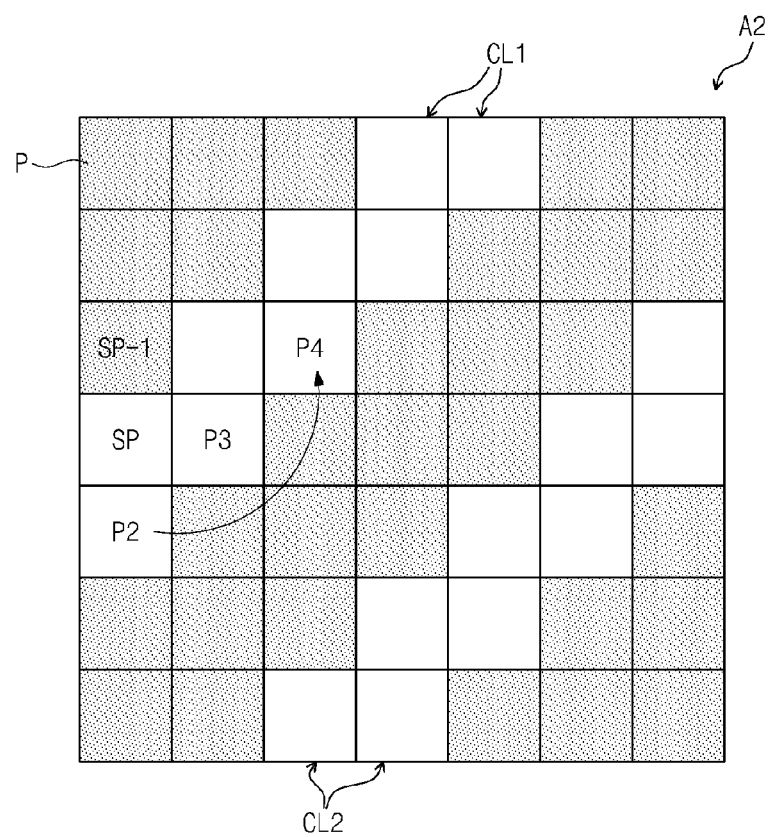

Referring to FIGS. 9 and 10C, since the third pixel P3 is registered and the coordinates of the currently registered pixel P3 are not included in the coordinates of the boundary line pixels, the method proceeds to operation S310 again.

The currently registered pixel P3 is the third pixel P3 and a previous point pixel P2 of the third pixel P3 is the second pixel P2. Accordingly, the gradations of the currently registered third pixel P3 and the pixels P adjacent thereto are compared counterclockwise from the second pixel P2, i.e., the previous point pixel P2, by using the currently registered third pixel P3 as an axis in operation S310.

In operation S320, except for the previously registered pixels SP and P2, an adjacent pixel having the same gradation as the currently registered third pixel P3 is detected. Accordingly, except for the start point pixel SP and the second pixel P2, as rotating counterclockwise from the second pixel P2, a fourth pixel P4 disposed in a diagonal direction of the top right of the third pixel P3 and having the first gradation is detected as an adjacent pixel having the same gradation as the third pixel P3.

In operation S330, the detected fourth P4 is registered and the counting value C is counted as 3. In operation S340, the counting value C and the reference value R are compared. In operation S350, it is tested whether the counting value C is greater than the reference value R. Since the current counting value C is 3, if the reference value R is set to 1, the counting value C is greater than the reference value R. Since the counting value C is greater than the reference value R, the coordinates of the registered fourth pixel P4 and the coordinates of the boundary line pixels are compared in operation S360.

In operation S370, the fourth pixel P4 is not included in the boundary line pixels. When the coordinates of the currently registered fourth pixel P4 are not included in the coordinates of the boundary line pixels, the method proceeds to operation S310.

Figure 10D:
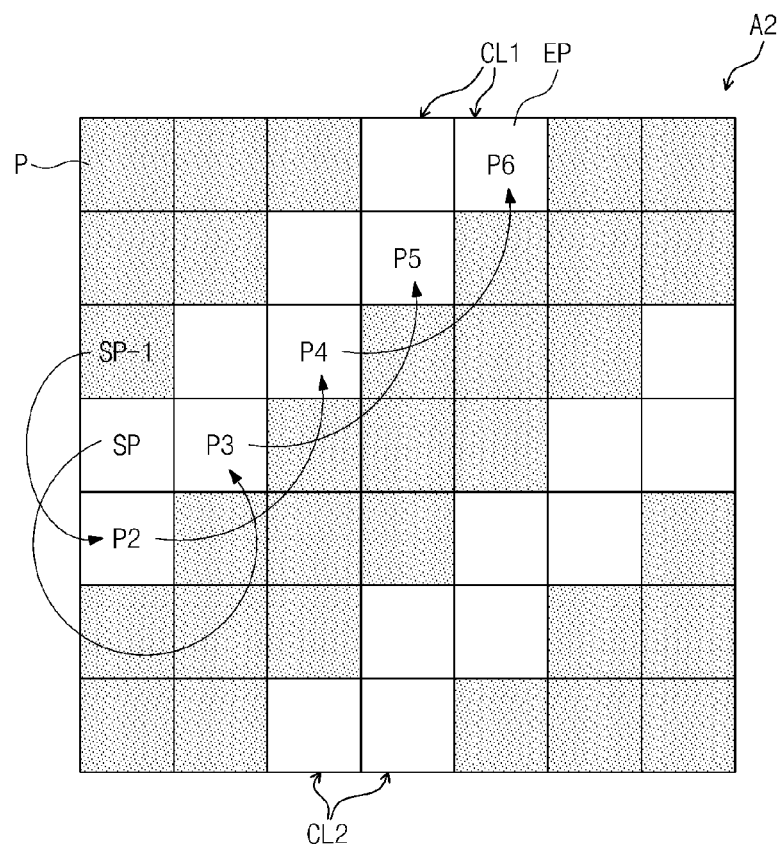

Referring to FIGS. 9 and 10D, when the above-mentioned pixel tracing operations (i.e., operation S310 to operation S370) repeat twice more, a sixth pixel P6 is registered in operation S330. Since the counting value C is greater than the reference value R, the coordinates of the sixth pixel P6 and the coordinates of the boundary line pixels are compared in operation S360 so that it is tested whether they are included in the coordinates of the boundary line pixels. The sixth pixel P6 is included in the boundary line pixels.

When the coordinates of the registered pixel are included in the coordinates of the boundary line pixels, the registered pixel is registered as the end point pixel EP in operation S380. The end point pixel EP is registered and the pixel tracing operation (i.e. operation S300) is terminated.

Referring to FIGS. 9 and 11A, the first gradation (indicated with white) displays an area where the first and second wires CL1 and CL2 are disposed, and the second gradation (indicated with gray) displays an area where the first and second wires CL1 and CL2 are not displayed. Therefore, the first wire CL1 is shown open in FIG. 11A.

When the above-mentioned pixel tracing operations (operation S310 to operation S380) repeat, the fifth pixel P5 is registered as shown in FIG. 11A in operation S330. The coordinates of the fifth pixel P5 are not included in the coordinates of the boundary line pixels. Accordingly, gradations of the currently registered fifth pixel P5 and pixels adjacent thereto are compared counterclockwise from the fourth pixel P4 by using the currently registered fifth pixel P5 in operation S310.

In operation S320, except for the previously registered pixels SP, P2, P3, and P4, an adjacent pixel having the same gradation as the currently registered fifth pixel P5 is detected. However, except for the previously registered pixels SP, P2, P3, and P4, all the pixels adjacent to the currently registered fifth pixel P5 have the second gradation. Accordingly, adjacent pixels having a similar gradation to the currently registered fifth pixel P5 are not detected in operation S320.

If adjacent pixels having a similar gradation to the currently registered fifth pixel P5 are not detected, the fifth pixel P5 is registered as the end point pixel EP I operation S390, and the pixel tracing operation (i.e., operation S300) is terminated.

Referring to FIGS. 9 and 11B, the first wire CL1 and the second wire CL2 are connected to each other so that they cause a short circuit as shown in FIG. 11B.

When the pixel tracing operations (i.e., operation S310 to operation S380) repeat, as shown in FIG. 11B, an eighth pixel P8 is registered in operation S330. In this case, it is tested whether the coordinates of the registered eighth pixel P8 are included in the coordinates of the boundary line pixels in operation S370.

The coordinates of the eighth pixel P8 are included in the coordinates of the boundary line pixels. Accordingly, the registered eighth pixel P8 is registered as the end point pixel EP in operation S380 and the pixel tracing operation (i.e., operation S300) is terminated.

For convenience of description, the second area A2 is used as an example, but substantially, the pixel tracing operations (operation S310 to operation S390) are performed on the pixels P where an image of the pad area PDA is displayed.

After the pixel tracing operations (operation S310 to operation S390) are performed, the boundary area is set as an area where the registered pixels are disposed in operation S400. That is, the boundary area includes pixels having the same gradation.

Figure 12:
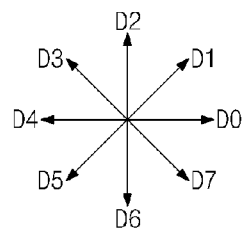
FIG. 12 illustrates an 8-direction chain code.

FIG. 12 is a view illustrating an 8-direction chain code.

Referring to FIG. 12, the 8-direction chain code may be defined as flag codes having 8 directions. The 8 directions extend radially with the same interval to each other, each has the same interval. The flag codes D0, D1, D2, D3, D4, D5, D6, and D7 are sequentially designated counterclockwise.

The flag codes include zeroth to seventh directions D0, D1, D2, D3, D4, D5, D6, and D7. For example, as shown in FIG. 12, the right direction is defined as the zeroth direction D1. The first to seventh directions D1, D2, D3, D4, D5, D6, and D7 extending radially counterclockwise from the zeroth direction D0 with the same interval to each other are defined.

Figure 13:
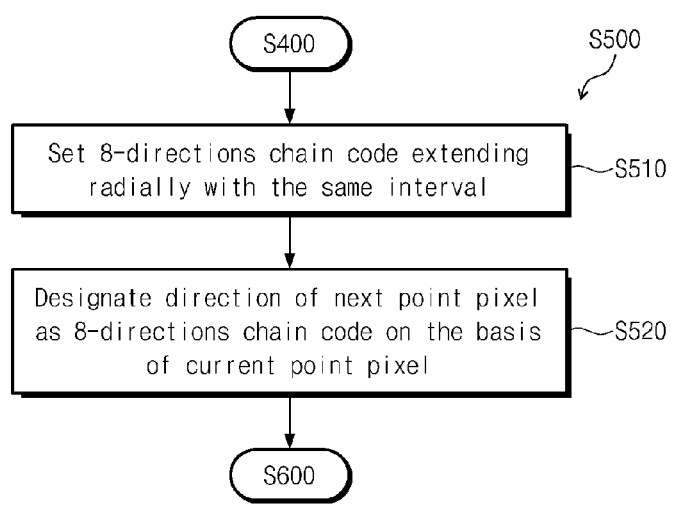
FIG. 13 is a flowchart illustrating a method of designating a direction code of FIG. 5.
Figure 14A:
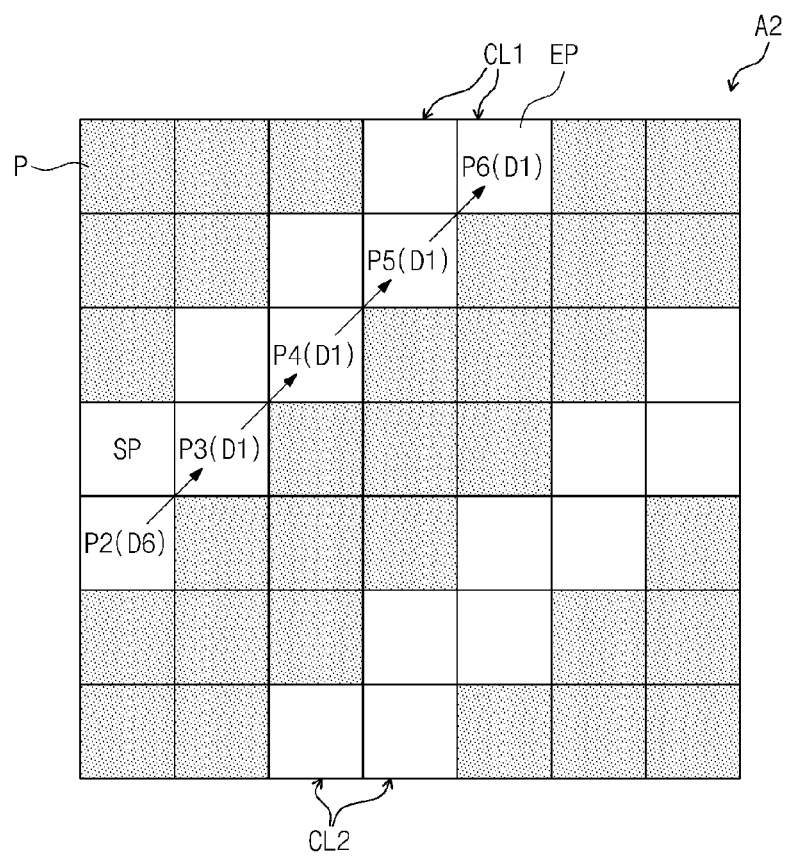
FIG. 14A illustrates when a direction code is designated to pixels of a second area of FIG. 10D.
Figure 14B:
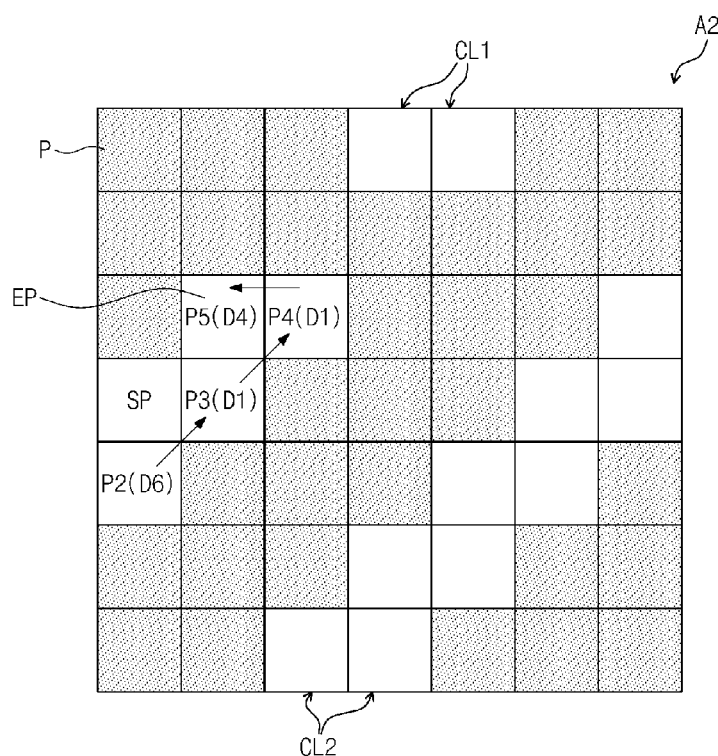
FIG. 14B illustrates when a direction code is designated to pixels of a second area of FIG. 11A.
Figure 14C:
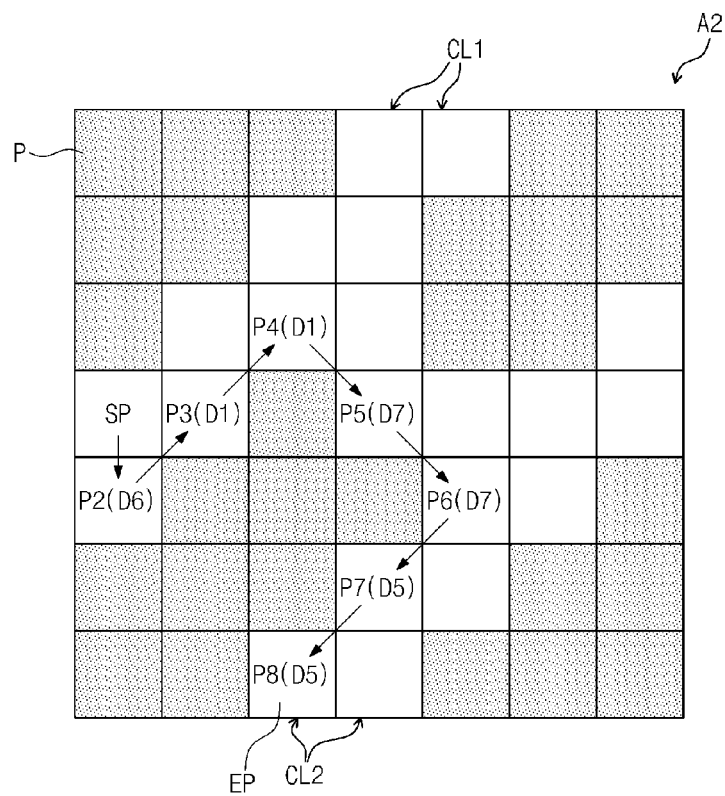
FIG. 14C illustrates when a direction code is designated to pixels of a second area of FIG. 11B.

FIG. 13 is a flowchart illustrating a method of designating a direction code of FIG. 5. FIG. 14A is a view of when a direction code is designated to pixels of a second area of FIG. 10D. FIG. 14B is a view of when a direction code is designated to pixels of a second area of FIG. 11A. FIG. 14C is a view of when a direction code is designated to pixels of a second area of FIG. 11B.

Referring to FIG. 13, in operation S510, as shown in FIG. 12, an 8-directions chain code extending radially with the same interval to each other is set. As mentioned above, the 8-direction chain code includes zeroth to seventh directions D0, D1, D2, D3, D4, D5, D6, and D7 extending radially.

Referring to FIGS. 13 and 14A, in operation S520, a direction of the next point pixel is designated as the 8-direction chain code on the basis of a current point pixel. For example, the second pixel P2 (i.e., the next point pixel) on the basis of the start point pixel SP (i.e., the current point pixel) is disposed in the bottom direction of the start point pixel SP. Accordingly, the second pixel P2 is designated as the sixth direction D6.

On the basis of the second pixel P2 (i.e., the current point pixel), the third pixel P3 (i.e., the next point pixel) is disposed in the diagonal direction of the top right. Accordingly, the third pixel P3 is designated as the first direction D1.

On the basis of the third pixel P3 (i.e., the current point pixel), the fourth pixel P4 (i.e., the next point pixel) is disposed in the diagonal direction of the top right. Accordingly, the fourth pixel P4 is designated as the first direction D1. Through such an operation, each of the fifth pixel P5 and the sixth pixel P6 is designated as the first direction D1.

Since there is no next pixel on the basis of the sixth pixel P6 (i.e., the current point pixel), the 8-direction chain code is not further designated. Additionally, since there is no registered pixel before the start point pixel SP, the 8-direction chain code is not designated to the start point pixel SP.

Referring to FIGS. 13 and 14B, in operation S520, a direction of the next point pixel on the basis of the current point pixel is designated as an 8-direction chain code. Like from the start point pixel SP to the fourth pixel P4 as shown in FIG. 4A, the 8-direction chain codes are designated to from the start point pixel SP to the fourth pixel P4.

The fifth pixel P5 (i.e., the next point pixel) on the basis of the fourth pixel P4 (i.e., the current point pixel) is disposed in the left direction. Accordingly, the fifth pixel P5 is defined as the fourth direction D4. Since there is no next pixel on the basis of the fifth pixel P5, the 8-direction chain code is not designated any more.

Referring to FIGS. 13 and 14C, in operation S520, a direction of the next point pixel is designated as the 8-direction chain code on the basis of a current point pixel. Like from the start point pixel SP to the fourth pixel P4 as shown in FIG. 4A, the 8-direction chain codes are designated to from the start point pixel SP to the fourth pixel P4.

On the basis of the fourth pixel P4 (i.e., the current point pixel), the fifth pixel P5 (i.e., the next point pixel) is disposed in the diagonal direction of the bottom right. Accordingly, the fifth pixel P5 is designated as the seventh direction D7.

According to the above-mentioned 8-direction chain code designating method, the sixth pixel P6 is designated as the seventh direction D7, and the seventh pixel P7 and the eighth pixel P8 are designated as the fifth direction D5. After the 8-direction chain codes are designated to the registered pixels, the direction code designating operation (i.e., operation S500) is terminated.

For convenience of description, the second area A2 is used as an example, but substantially, the above-mentioned direction code designating operations (operation S510 and operation S520) are performed on the pixels P where an image of the pad area PDA is displayed.

Figure 15:
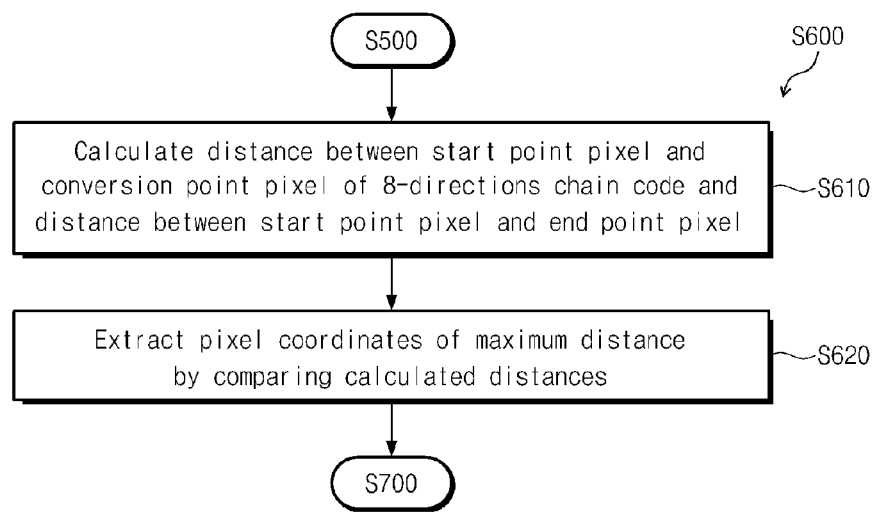
FIG. 15 is a flowchart illustrating a maximum distance pixel coordinates extracting method of FIG. 5.
Figure 16A:
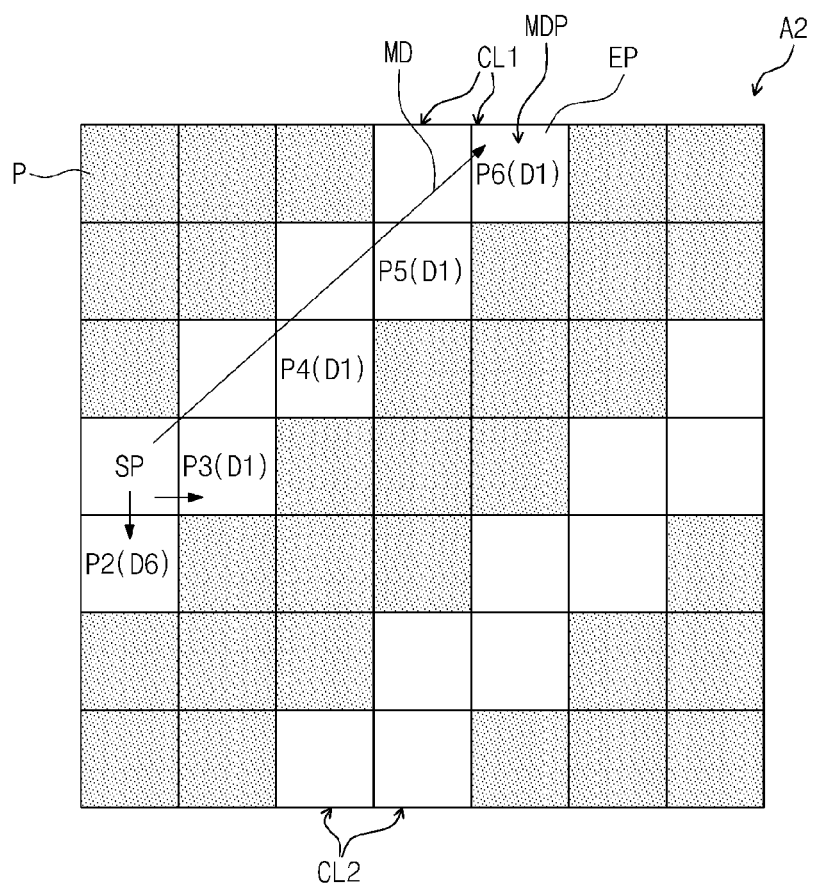
FIG. 16A illustrates a maximum distance pixel in an image of the second area of FIG. 14A to which a direction code is designated.
Figure 16B:
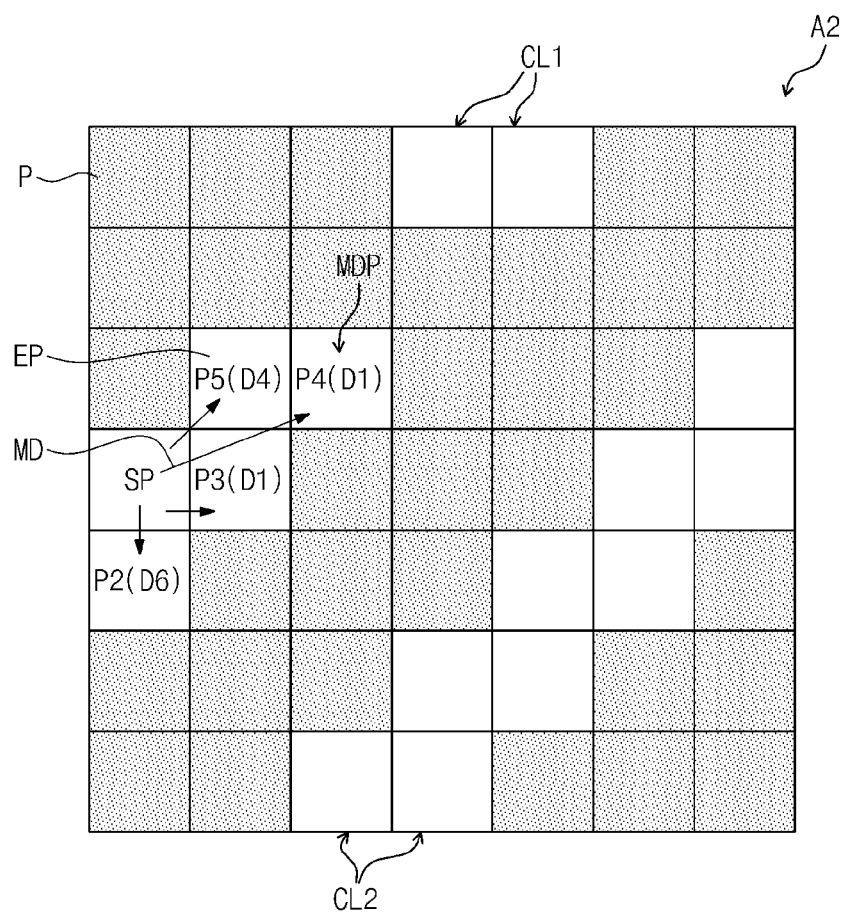
FIG. 16B illustrates a maximum distance pixel in an image of the second area of FIG. 14B to which a direction code is designated.
Figure 16C:
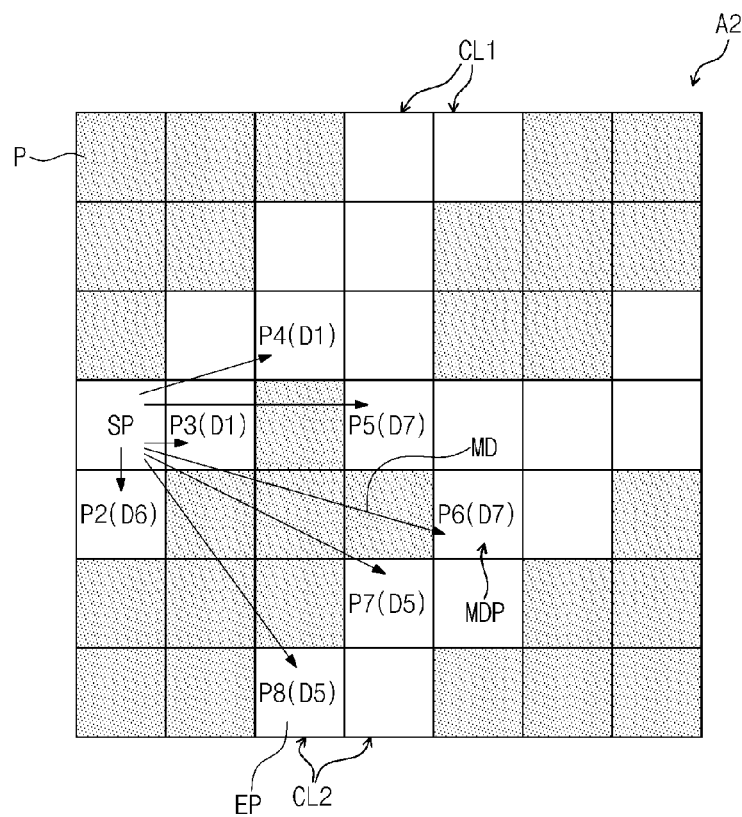
FIG. 16C illustrates a maximum distance pixel in an image of the second area of FIG. 14C to which a direction code is designated.
Figure 17:
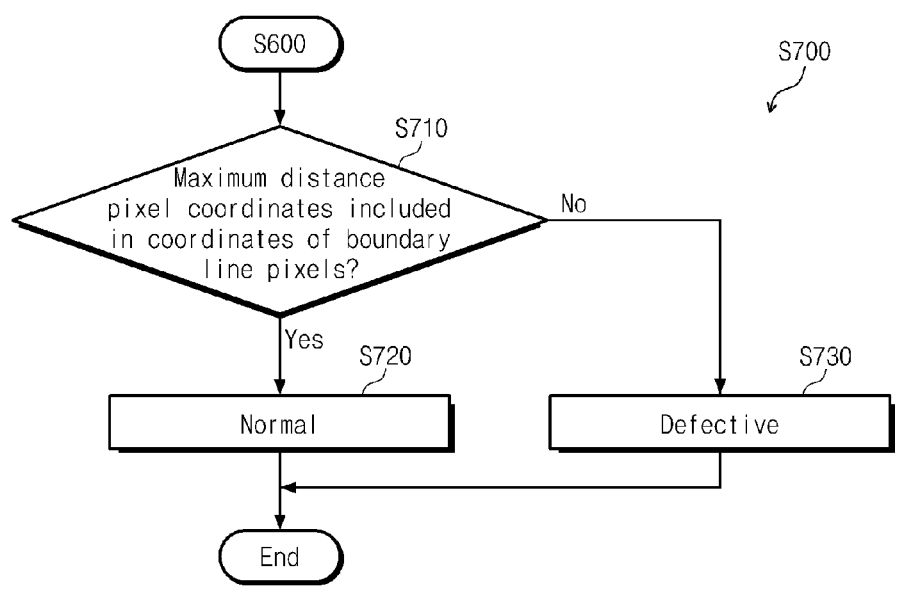
FIG. 17 is a flowchart illustrating a defectiveness determining method of FIG. 5.
Figure 18:
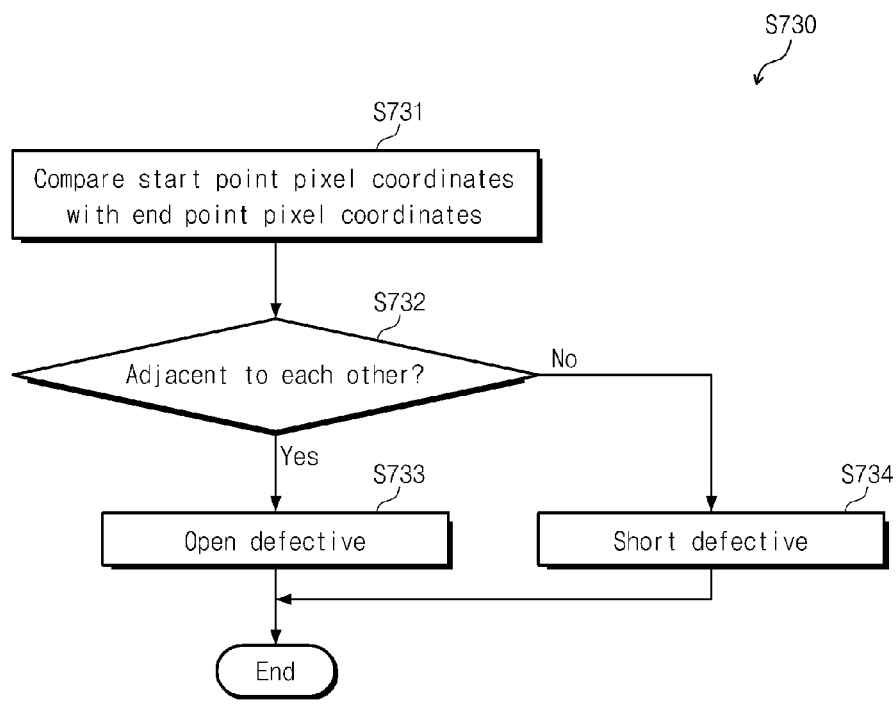
FIG. 18 is a flowchart illustrating an open and short defectiveness detecting method in the defectiveness determining operation of FIG. 17.

FIG. 15 is a flowchart illustrating a maximum distance pixel coordinates extracting method of FIG. 5. FIG. 16A is a view illustrating a maximum distance pixel in an image of the second area of FIG. 14A to which a direction code is designated. FIG. 16B is a view illustrating a maximum distance pixel in an image of the second area of FIG. 14B to which a direction code is designated. FIG. 16C is a view illustrating a maximum distance pixel in an image of the second area of FIG. 14C to which a direction code is designated. FIG. 17 is a flowchart illustrating a defectiveness determining method of FIG. 5. FIG. 18 is a flowchart illustrating an open and short defectiveness detecting method in the defectiveness determining is operation of FIG. 17.

Referring to FIGS. 15 and 16A, a distance between the start point pixel SP and 8-direction chain code conversion point pixels is calculated in operation S610. For example, the 8-direction chain code in the second pixel P2 and the third pixel P3 is converted from the sixth direction D6 into the first direction D1. In this case, each distance between the start point pixel SP and the second pixel P2 and between the start point pixel SP and the third pixel P3 is calculated in operation S610.

The eight-direction chain codes of the fourth to sixth pixels P4 to P6 are designated as the first direction D1. That is, the eight-direction chain codes of the fourth to sixth pixels P4 to P6 are not converted. Accordingly, each distance between the start point pixel SP and the fourth to sixth pixels P4 to P6 is not calculated.

Additionally, a distance between the start point pixel SP and the end point pixel EP is calculated in operation S610. For example, as mentioned above, the sixth pixel P6 is the end point pixel EP. In this case, a distance between the start point pixel SP and the sixth pixel P6 is calculated in operation S610.

After the distances calculated in operation S620 are compared, pixel coordinates of the maximum distance are extracted. As shown in FIG. 16A, among the calculated results, a distance between the start point pixel SP and the sixth pixel P6 is the longest as the maximum distance MD. Therefore, the sixth pixel P6 is set as the maximum distance pixel MDP and the coordinates of the sixth pixel P6 are extracted as the coordinates of the maximum distance pixel MDP in operation S620.

Referring to FIGS. 15 and 16B, a distance between the start point pixel SP and the 8-direction chain code conversion point pixels is calculated in operation S610. For example, the 8-direction code in the second pixel P2 and the third pixel P3 is converted from the sixth direction D6 to the first direction D1. The 8-direction code in the fourth pixel P4 and the fifth pixel P5 is converted from the first direction D1 to the fourth direction D1. Additionally, the fifth pixel P5 is an end point pixel EP.

Accordingly, each distance between the start point pixel SP and the second pixel P2, between the start point pixel SP and the third pixel P3, between the start point pixel SP and the fourth pixel P4, and between the start point pixel SP and the fifth pixel P5 is calculated.

As shown in FIG. 16B, among the calculated results, a distance between the start point pixel SP and the fourth pixel P4 is the longest as the maximum distance MD. Therefore, the fourth pixel P4 is set as the maximum distance pixel MDP and the coordinates of the fourth pixel P4 are extracted as the coordinates of the maximum distance pixel MDP in operation S620.

Referring to FIGS. 15 and 16C, a distance between the start point pixel SP and chain code conversion point pixels is calculated in operation S610.

Referring to the operations described with reference to FIGS. 15, 16A, and 16B, as shown in FIG. 16C, a distance between the start point pixel SP and the sixth pixel P6 is the longest as the maximum distance MD. Therefore, the sixth pixel P6 is set as the maximum distance pixel MDP and the coordinates of the sixth pixel P6 are extracted as the coordinates of the maximum distance pixel MDP in operation S620. After the coordinates of the maximum distance pixel MDP are extracted, the maximum distance pixel coordinates extracting operation (i.e., operation S600) is terminated.

For convenience of description, the second area A2 is used as an example, but substantially, the maximum distance pixel coordinates extracting operations (operation S610 and operation S620) are performed on the pixels P where an image of the pad area PDA is displayed.

Referring to FIGS. 16A and 17, it is tested whether the coordinates of the maximum distance pixel MDP are included in the coordinates of the boundary line pixels in operation S710. The sixth pixel P6 (i.e., the maximum distance pixel MDP) among the pixels shown in FIG. 16A is included in the boundary line pixels. Accordingly, the coordinates of the sixth pixel (i.e., the maximum distance pixel MDP) are included in the coordinates of the boundary line pixels.

When the coordinates of the sixth pixel P6 (i.e., the maximum distance pixel MDP) are included in the coordinates of the boundary line pixels, it is determined in operation S720 that the boundary area defined as an area where the registered pixels are disposed is normal. That is, it is determined in operation S720 that the first wire CL1 shown in the image of the second area A2 is normal. Through the same method, it may be determined that the second wire CL2 shown in the image of the second area A2 is normal.

The image of the second area A2 shown in FIG. 16A illustrates an image of the second area A2 in a normal status. That is, through a substrate inspecting method according to an embodiment of the inventive concept, the first and second wires CL1 and CL2 in the second area A2 may be determined as normal.

Referring to FIGS. 16B, 17, and 18, it is tested in operation S710 whether the coordinates of the maximum distance pixel MDP are included in the coordinates of the boundary line pixels.

The fourth pixel P4 (i.e., the maximum distance pixel MDP) shown in FIG. 16B is not included in the boundary line pixels. Accordingly, the coordinates of the fourth pixel P4 (i.e., the maximum distance pixel MDP) are not included in the coordinates of the boundary line pixels. In this case, it is determined in operation S730 that the boundary area defined as an area where registered pixels are disposed is determined as defective. That is, it is determined in operation S730 that the first wire CL1 is determined as defective.

When the first wire CL1 is determined as defective, the coordinates of the start point pixel SP and the coordinates of the end point pixel EP are compared in operation S731. The end point pixel EP is the fifth pixel P5 as shown in FIG. 16B.

In operation S732, it is tested whether the start point pixel SP is adjacent to the end point pixel EP. An adjacent pixel may be defined as a pixel disposed adjacent to the start point pixel SP. As shown in FIG. 16B, the end point pixel EP as the fifth pixel P5 is disposed adjacent to the start point pixel SP.

When the start point pixel SP and the end point pixel EP are adjacent to each other, it is determined in operation S733 that a boundary area defined as an area where registered pixels are disposed is determined open defective. That is, it is determined in operation S733 that the first wire CL1 shown in an image of the second area A21 is determined as open defective.

The image of the second area A2 shown in FIG. 16B illustrates an image in an open defective status. That is, through a substrate inspecting method according to an embodiment of the present invention, the first wire CL1 shown in the second area A2 may be determined as open defective.

Referring to FIGS. 16C, 17, and 18, it is tested in operation S710 whether the coordinates of the maximum distance pixel MDP are included in the coordinates of the boundary line pixels.

The sixth pixel P6 (i.e., the maximum distance pixel MDP) shown in FIG. 16C is not included in the boundary line pixels. Accordingly, the coordinates of the sixth pixel P6 (i.e., the maximum distance pixel MDP) are not included in the coordinates of the boundary line pixels. In this case, it is determined in operation S730 that the boundary area defined as an area where registered pixels are disposed is determined as defective. That is, it is determined in operation S730 that the first wire CL1 is determined as defective.

When the first wire CL1 is determined as defective, the coordinates of the start point pixel SP and the coordinates of the end point pixel EP are compared in operation S731. The end point pixel EP is the eighth pixel P8 as shown in FIG. 16C.

In operation S732, it is tested whether the start point pixel SP is adjacent to the end point pixel EP. As shown in FIG. 16C, the end point pixel EP as the eighth pixel P8 is disposed adjacent to the start point pixel SP.

When the start point pixel SP and the end point pixel EP are not adjacent to each other, it is determined in operation S734 that a boundary area defined as an area where registered pixels are disposed is determined short defective. That is, it is determined in operation S734 that the first wire CL1 shown in an image of the second area A21 is determined as open defective, i.e., short-circuited.

The image of the second area A2 shown in FIG. 16C illustrates an image in a short defective status. That is, the first wire CL1 is short-circuited to the adjacent second wire CL2. Accordingly, through a substrate inspecting method according to an embodiment of the present invention, the first wire CL1 shown in the second area A2 may be determined as short defective.

For convenience of description, the second area A2 is used as an example, but substantially, the defectiveness determining operations (operation S710 to operation S730) are performed on the pixels P where an image of the pad area PDA is displayed.

Figure 19:
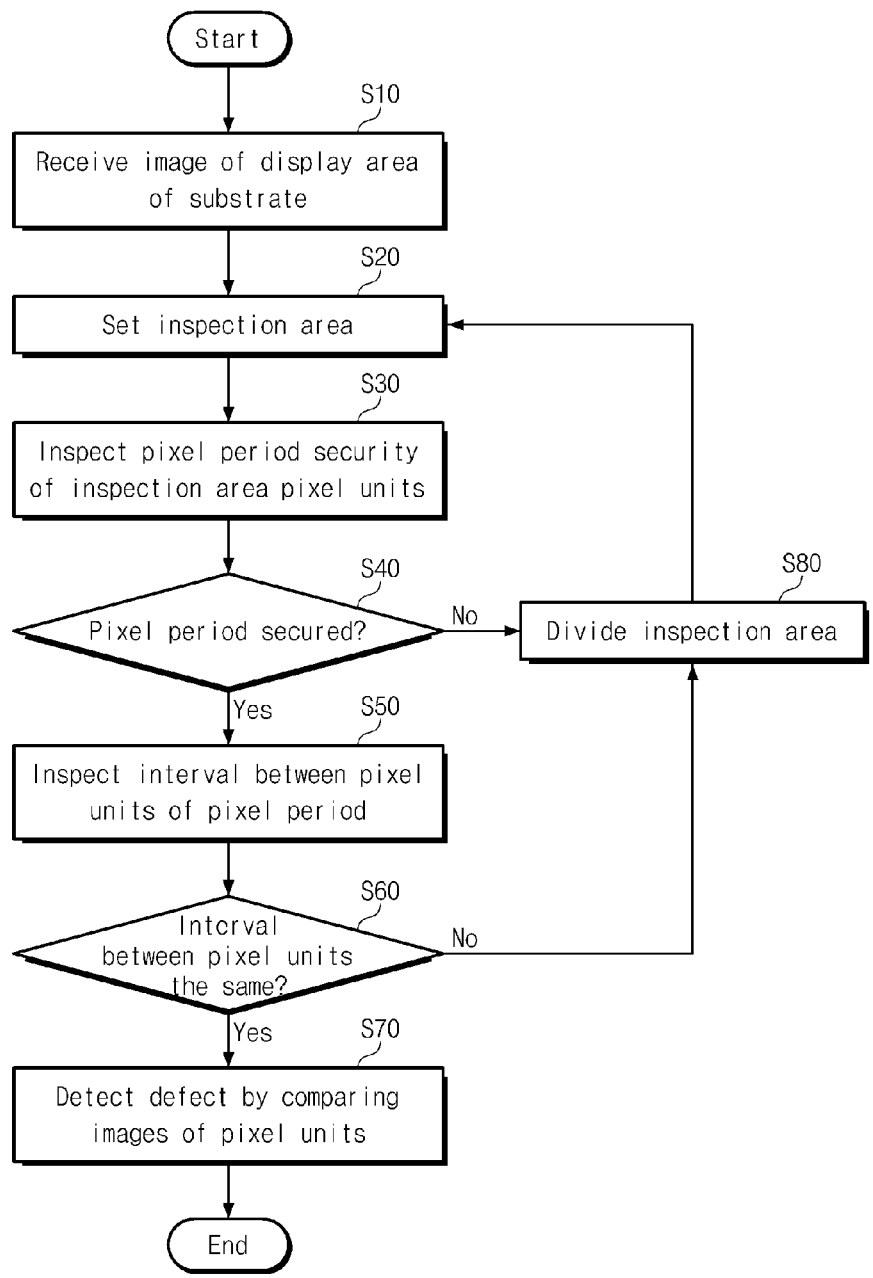
FIG. 19 is a flowchart illustrating a method of inspecting a display area of the substrate of FIG. 2.

FIG. 19 is a flowchart illustrating a method of inspecting a display area of the is substrate of FIG. 2. FIGS. 20A and 20B and FIGS. 21A to 21C are views illustrating pixel units of a display area.

Figure 20A:
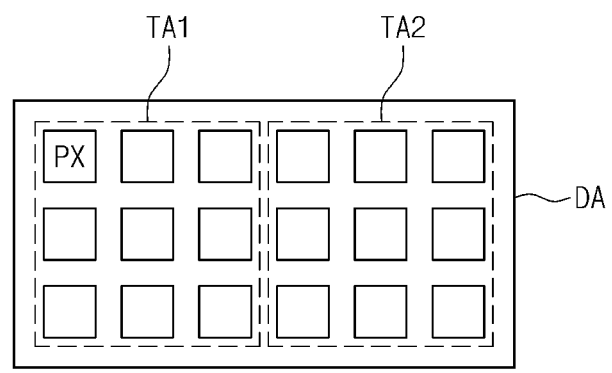
FIGS. 20A and 20B and FIGS. 21A to 21C illustrate pixel units of a display area.

For convenience of description, although 3×6 pixel units PX are shown in FIG. 20A, more pixel units PX may be substantially disposed in the display area DA. Additionally, for convenience of description, although 3×8 pixel units PX are shown in FIGS. 20A and 20C, more pixel units PX may be substantially disposed in the display area DA.

Figure 20B:
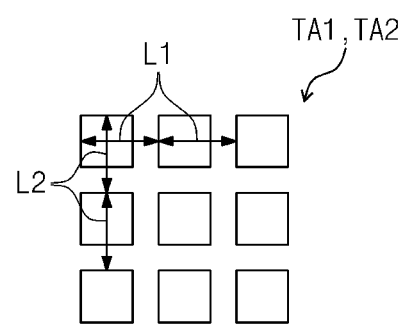

Referring to FIGS. 19, 20A, and 20B, an image of a display area of a substrate is provided in operation S10. An inspection area is set in operation S20. The display area DA shown in FIG. 20A may be set as an inspection area.

In operation S30, a pixel period security of inspection area pixel units is tested. For example, 3×6 pixel units PX are disposed in the display area DA, i.e., an inspection area. The pixel units PX disposed in the display area DA are divided by a pixel period defined with a predetermined pixel unit number. According to an embodiment of the inventive concept, the pixel period may be set to 9.

In operation S40, a determination is made on whether a pixel period is secured. In more detail, when the number of the pixel units PX is divided by the pixel period, the pixel period is secured. However, when the number of the pixel units PX is divided and there is a remainder, the pixel period is not secured.

For example, since 3×6 pixel units PX are disposed in the display area DA, they are divided by the pixel period set to 9 and there is no remainder. Therefore, the pixel period is secured. By the secured pixel period, the pixel units PX are divided into pixels units PX of a first period area TA1 and pixels units PX of a second period area TA2. That is, as shown in FIG. 19A, the pixel units PX are divided by 9 unit pixels PX.

When the pixel period is secured, an interval between the pixel units PX is inspected in operation S50. The pixel units PX of each of the first and second period areas TA1 and TA2 has a first interval L1 in a row direction and a second interval L2 in a column direction, so that they have the same interval to each other.

In operations, it is inspected in operation S60 whether an interval between the pixel units PX has the same interval. Since the pixel units PX of each of the first and second period areas TA1 and TA2 have a first interval L1 in a row direction and a second interval L2 in a column direction, so that they have the same interval to each other.

When the pixel units PX of each of the period areas TA1 and TA2 have the same interval to each other, the pixel units PX are compared by each of the period areas TA1 and TA2, so that it is detected whether the pixel units PX are defective in operation S70.

For example, nine pixel units PX captured by the image capturing unit 200 are image-processed by the image processing unit 300 and then are displayed as a plurality of pixels. The inspection unit 400 compares the nine pixel units PX to detect a pixel unit PX having a different image as defective. For example, when eight units PX among the nine pixel units PX have the same image but the remaining one unit pixel PX has a different image, this is determined as defective. That is, after pixels having the same interval to each other are divided by a predetermined number unit, the images of the pixel units PX are compared to determine whether the pixel units PX are defective.

Figure 21A:
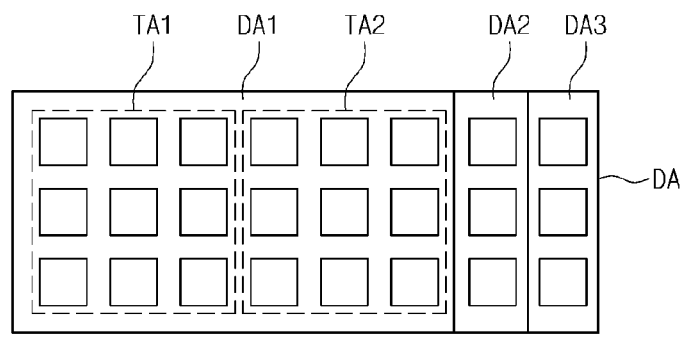
Figure 21B:
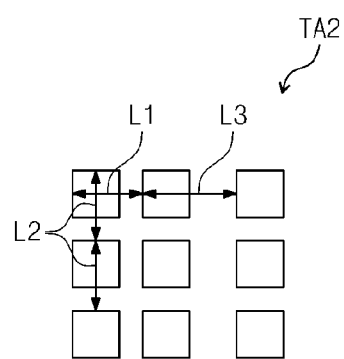
Figure 21C:
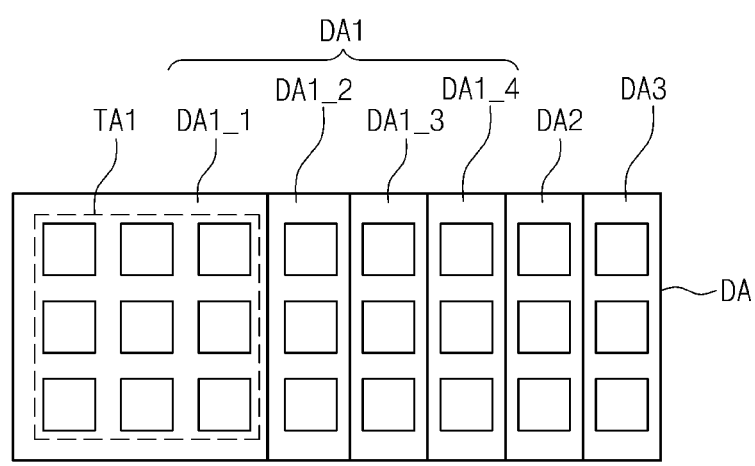

Referring to FIGS. 19, 21A, and 21C, an image of the display area DA in a substrate is provided in operation S10. An inspection area is set in operation S20. The display area DA is set as the inspection area in operation S20, and a pixel period security is inspected in operation S30.

Since 3×8 unit pixels are disposed in the display area DA, they are divided by a pixel period set to 9 and there is a remainder. Accordingly, the pixel period is not secured in operation S40.

When the pixel period is not secured, the inspection area is divided in operation S80. The inspection area may be divided by one column unit from the right of the display area DA. That is, the inspection area may be divided by an area unit where 3×1 pixel units PX are disposed, from the right of the display area DA.

In operation S20, the inspection area may be set as an area disposed at the leftmost in the divided area. Such an operation may repeat until the pixel period is secured. That is, the inspection area setting operation (i.e., operation S20), the pixel period security inspecting operation (i.e., operation S30), the pixel period security determining operation (i.e., operation S40), and the inspection area dividing operation (i.e., operation S80) repeat until the pixel period is secured.

When the inspection area setting operation (i.e., operation S20), the pixel period security inspecting operation (i.e., operation S30), the pixel period security determining operation (i.e., operation S40), and the inspection area dividing operation (i.e., operation S80) repeat, as shown in FIG. 21A, the display area DA may be divided into a first display area DA1 including 3×6 pixel units PX, a second display area DA2 disposed at the right of the first display area DA1 and including 3×1 pixel units PX, and a third display area DA3 disposed at the right of the second display area DA2 and including 3×1 pixel units PX.

An inspection area may be set as a first display area DA1 disposed at the leftmost in the divided areas in operation S20. As shown in FIG. 21B, the pixel units PX of each of the period areas TA1 and TA2 have a first interval L1 and a third interval L3 longer than the first interval L1 in a row direction, and have a second interval L2 in a column direction. The pixel units PX of the first period area TA1 may be disposed to have the same interval as shown in FIG. 20B.

When the pixel period is secured, an interval between the pixel units PX is inspected in operation S50. As shown in FIG. 21B, the pixel units PX of each of the period areas TA1 and TA2 have a first interval L1 and a third interval L3 longer than the first interval L1 in a row direction and has a second interval L2 in a column direction. As shown in FIG. 20B, the pixel units PX of the first period area TA1 may be disposed with the same interval.

In operation S60, it is inspected whether intervals between the unit pixels PX are identical to each other. Since the pixel units PX of the second period area TA2 have the first interval and the third interval L3 longer than the first interval L2, they are not disposed with the same interval in the row direction.

In this case, the inspection area is divided again in operation S80. The inspection area setting operation (i.e., operation S20), the pixel period security inspecting operation (i.e., operation S30), the pixel period security determining operation (i.e., operation S40), and the inspection area dividing operation (i.e., operation S80) may repeat until the pixel period is secured.

When the inspection area setting operation (i.e., operation S20), the pixel period security inspecting operation (i.e., operation S30), the pixel period security determining operation (i.e., operation S40), and the inspection area dividing operation (i.e., operation S80) repeat, as shown in FIG. 21C, the first display area DA1 may be divided into a 1_1 display area DA1_1 including 3×3 pixel units PX, a 1_2 second display area DA1_2 disposed at the right of the 1_1 display area DA1_1 and including 3×1 pixel units PX, a 1_3 display area DA1_3 is disposed at the right of the second display area DA1_2 and including 3×1 pixel units PX, and a 1_4 display area disposed at the right of the 1_3 display area DA1_3 and including 3×1 pixel units PX.

Since the 3×3 pixel units PX are disposed in the 1_1 display area DA1_1, they are divided by a pixel period set to 9 and there is no remainder. Accordingly, the pixel period is secured. The 3×3 pixel units PX are disposed in the first period area TA1 of the 1_1 display area DA1_1.

When the pixel period is secured, it is inspected in operation S50 whether an interval between the pixel units PX is identical. The pixel units PX of the first period area TA1 have the same interval in the 1_1 display area DA1_1. Accordingly, each unit pixel PX is compared by each period area so that it is detected in operation S40 whether the pixel unit PX is defective.

When the method of inspecting the display area DA of the substrate 100 is applied to a method of inspecting the pad area PDA, a non inspection area may occur. That is, although the connection wires CL1 to CLi adjacent to the data pads DP1 to Dpi are disposed with the same interval as shown in FIG. 3, the connection wires CL1 to CLi extending radially are not substantially disposed with the same interval. Additionally, since the connection wires CL1 to CLi in a square form also do not have the identical length, they are not disposed with the same interval. Therefore, when the method of inspecting the display area DA is applied to the method of inspecting the pad area PDA, a non inspection area may occur. Therefore, a defectiveness inspection may not be performed on the entire pad area PDA.

However, the method of inspecting the pad area PDA of the substrate 100 according to an embodiment of the inventive concept may perform a defectiveness inspecting is operation on the entire pad area PDA regardless of whether the connection wires CL1 to CLi and the data pads DP1 to Dpi are arranged with the same interval.

As a result, the substrate inspecting method may efficiently inspect the pad area PDA of the substrate 100.

Figure 23:
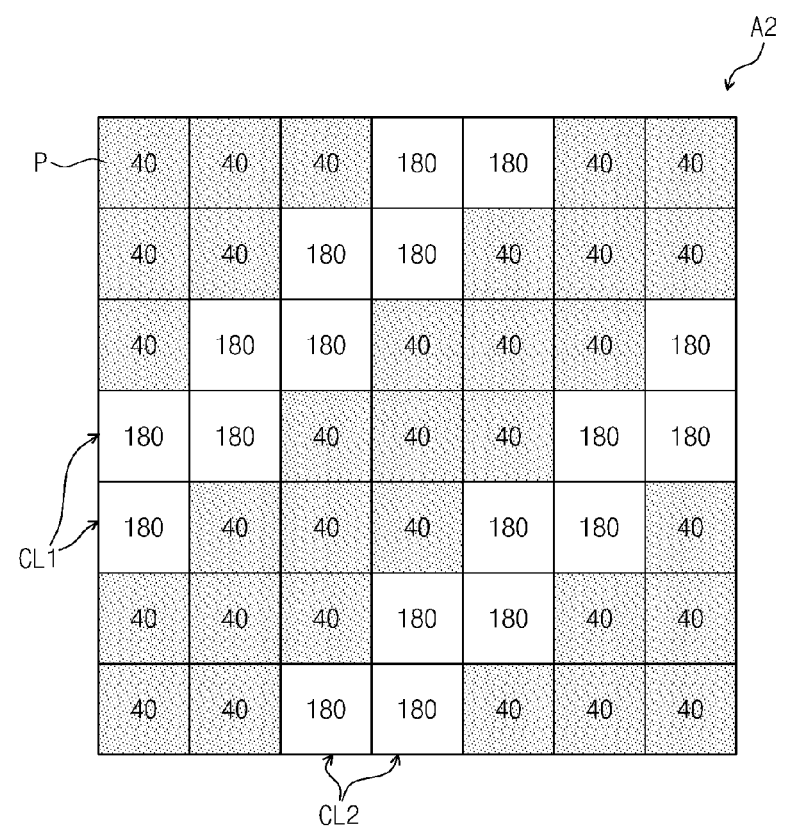

FIG. 22 is a flowchart illustrating a method of inspecting a pad area of a substrate according to another embodiment of the inventive concept. FIG. 23 is a view illustrating a thinning processing operation of FIG. 22.

Except for the thinning processing operation (i.e., operation S800_1), the method of inspecting a pad area of FIG. 22 is identical to the method of inspecting the pad area of FIG. 5. Accordingly, hereinafter, the thinning processing operation (i.e., operation S800_1) of FIG. 22 is described, and other operations are not described. FIG. 23 is a view illustrating an image processing status of the second area of FIG. 3.

Referring to FIGS. 22 and 23, the thinning processing operation (i.e., operation S800_1) is performed to display an image of a substrate captured by the image processing unit 300 with two gradations having different brightness.

An area where the first and second wires CL1 and CL2 are disposed may be displayed as pixels P having a first gradation including one brightness level. An area where the first and second wires CL1 and CL2 are not disposed may be displayed as pixels P having a second gradation including another brightness level.

According to an exemplary embodiment of the inventive concept, the area where the first and second wires CL1 and CL2 are disposed may be displayed as the pixels P having a first gradation with 180 brightness levels. The area where the first and second wires CL1 and CL2 are not disposed may be displayed as the pixels having a second gradation with 40 brightness levels.

Through the thinning processing operation (i.e., operation S800_1), the area where the first and second wires CL1 and CL2 are disposed and the area where the first and second wires CL1 and CL2 are not disposed may be displayed each having a gradation with one brightness level. Accordingly, the area where the first and second wires CL1 and CL2 are disposed and the area where the first and second wires CL1 and CL2 are not disposed may be clearly distinguished from each other.

The method of inspecting a pad area of FIG. 22 is identical to that of FIG. 5.

As a result, the method of inspecting a pad area according to another embodiment of the inventive concept may effectively inspect a pad area of a substrate.

Figure 24:
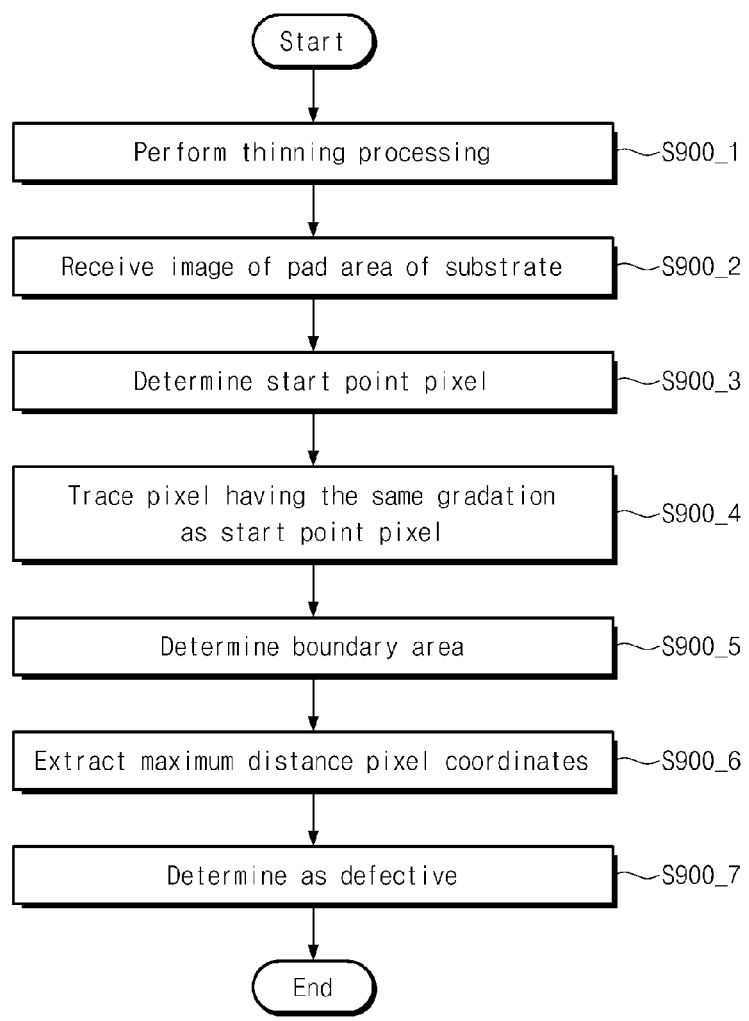
FIG. 24 is a flowchart illustrating a method of inspecting a pad area of a substrate according to another embodiment of the inventive concept.
Figure 25:
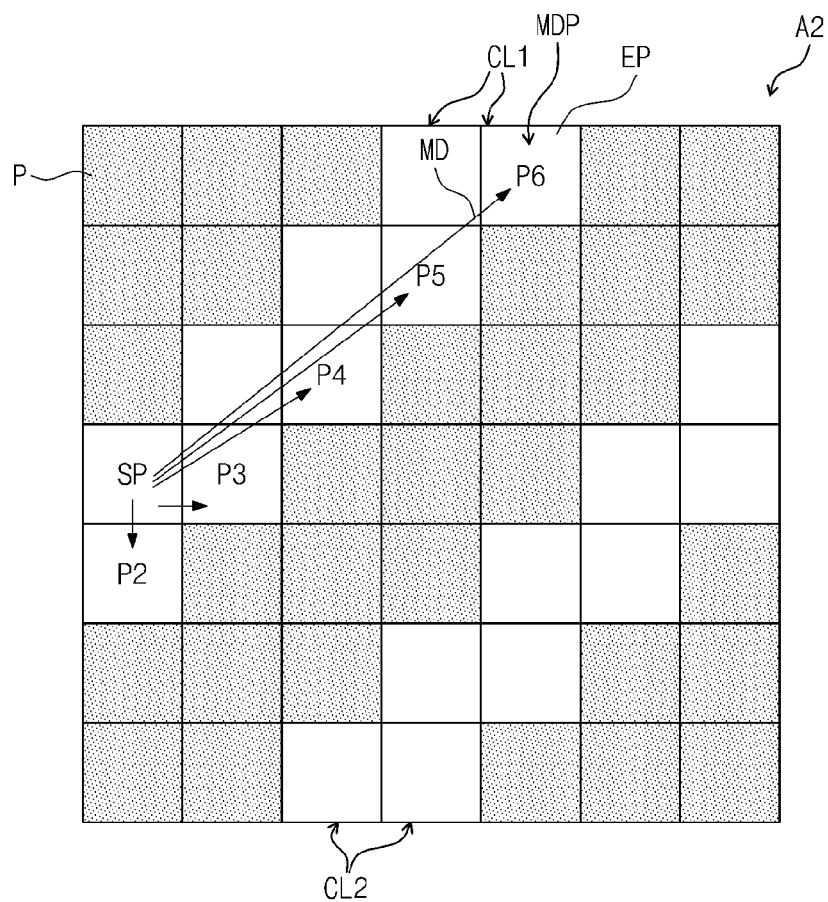
FIG. 25 illustrates a maximum distance pixel coordinates extracting operation of FIG. 24.

FIG. 24 is a flowchart illustrating a method of inspecting a pad area of a substrate according to another embodiment of the inventive concept. FIG. 25 is a view illustrating a maximum distance pixel coordinates extracting operation of FIG. 24.

Except that the direction code designating operation is omitted and the maximum distance pixel coordinates extracting operation is different, the method of inspecting a pad area of FIG. 24 is identical to that of FIG. 22. Accordingly, hereinafter, the maximum distance pixel coordinates extracting operation (i.e., operation S900_6) is described, and other operations are not described. FIG. 25 is a view illustrating an image processing status of the second area of FIG. 3.

Referring to FIGS. 24 and 25, each distance between the start point pixel SP and the second to sixth pixels P2 to P6 is calculated in the maximum distance pixel coordinates extracting operation (i.e., operation S900_6). For example, each distance between the start point pixel SP and the second pixel P2, between the start point pixel SP and the third pixel P3, between the start point pixel SP and the fourth pixel P4, between the start point pixel SP and the fifth pixel P5, and between the start point pixel SP and the sixth pixel P6 is calculated.

By comparing the calculated distances, the pixel coordinates of the maximum distance are extracted. As shown in FIG. 24, among the calculated results, the distance between the start point pixel SP and the sixth pixel P6 is the longest as the maximum distance MD. Accordingly, the sixth pixel P6 is set as the maximum distance pixel MDP, and the coordinates of the sixth pixel P6 are extracted as the coordinates of the maximum distance pixel MDP.

The method of inspecting another pad area of FIG. 24 is identical to that of FIG. 22.

As a result, the method of inspecting a pad area according to another embodiment of the inventive concept may efficiently inspect a pad area of a substrate.

The substrate inspecting method of the inventive concept can effectively inspect a pad area of a substrate.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method of inspecting a substrate, the method comprising:
   receiving an image of a substrate;
   determining and registering a start point pixel in an image of a pad area disposed adjacent to a display area of the substrate;
   sequentially tracing pixels having the same gradation as the start point pixel from the start point pixel and registering the traced pixels;
   setting an area where the registered pixels are disposed as a boundary area;
   designating, to the next point pixel, a direction code corresponding to a direction in which the next point pixel is disposed, on the basis of a current point pixel in the registered pixels of the boundary area;
   extracting maximum distance pixel coordinates disposed at the maximum distance from the start point pixel by calculating each distance between the start point pixel and a pixel disposed at a conversion point of the direction code and between the start point pixel and an end point pixel registered lastly among the registered pixels; and
   detecting a defect of the pad area by comparing the maximum distance pixel coordinates with coordinates of the pixels disposed at the boundary line and coordinates of the start point pixel with coordinates of the end point pixel.

2. The method of claim 1, wherein the determining of the start point pixel comprises:
   detecting a gradation change of the pixels disposed at the boundary line as moving on the pixels disposed at the boundary line; and
   registering a pixel having the gradation change as the start point pixel and initializing a count value.

3. The method of claim 2, wherein the tracing of the pixels comprises:
   comparing gradations of a currently registered pixel and pixels adjacent thereto counterclockwise from a previous point pixel by using the currently registered pixel as an axis;
   detecting the adjacent pixel having the same gradation as the currently registered pixel, excluding a previously registered pixel;
   registering, when the adjacent pixel having the same gradation as the currently registered pixel is detected, the detected pixel and counting the count value;
   registering, when the adjacent pixel having the same gradation as the currently registered pixel is not detected, the currently registered pixel as an end point pixel;
   comparing the counting value with a reference value;
   comparing, when the counting value is greater than the reference value, coordinates of the registered pixel with the coordinates of the boundary line pixels;
   comparing, when the counting value is not greater than the reference value, gradations of the currently registered pixel and the adjacent pixel;
   registering, when the coordinates of the registered pixel are included in the coordinates of the boundary line pixels, the registered pixel as the end point pixel; and
   comparing, when the coordinates of the registered pixel are not included in the coordinates of the boundary line pixels, gradations of the registered pixel and the adjacent pixels.

4. The method of claim 1, wherein the designating of the direction code comprises:
   setting an 8-direction chain code extending radially with the same interval; and
   designating, as the 8-direction chain code, a direction in which the next point pixel is disposed on the basis of the current point pixel in the sequentially registered pixels.

5. The method of claim 4, wherein the extracting of the maximum distance pixel coordinates comprises:
- calculating a distance between the start point pixel and a pixel of a conversion point of the 8-direction chain code and a distance between the start point pixel and the end point pixel; and
- extracting coordinates of the maximum distance pixel by comparing the calculated distances.

6. The method of claim 1, wherein the detecting of the defect of the pad area comprises:
- comparing the coordinates of the maximum distance pixel with the coordinates of the boundary line pixels;
- determining, when the coordinates of the maximum distance pixel are included in the coordinates of the boundary line pixels, the boundary area as normal; and
- determining, when the coordinates of the maximum distance pixel are not included in the coordinates of the boundary line pixels, the boundary area as defective.

7. The method of claim 6, wherein the determining of the boundary area as defective comprises:
- comparing the coordinates of the start point pixel with the coordinates of the end point pixel;
- determining, when the start point pixel is disposed adjacent to the end point pixel, the boundary area as open defective; and
- determining, when the start point pixel is not disposed adjacent to the end point pixel, the boundary area as short defective.

8. The method of claim 1, wherein the substrate comprises:
- a plurality of pixel units disposed in the display area and connected to gate lines and data lines intersecting each other; and
- a plurality of data pads disposed in the pad area, a plurality of connection wires connected to corresponding data lines, and a plurality of data pads connected to corresponding connection wires,
- wherein the connection wires extend downwardly by a distance with the same interval and extend radially to connect to the corresponding data lines.

9. The method of claim 8, wherein the connection wires and the data pads in the image of the pad area are displayed as pixels having a first gradation with first brightness levels and an area where the connection wires and the data pads are not disposed is displayed as pixels having a second gradation lower than the first gradation with second brightness levels.

10. The method of claim 8, further comprising:
- capturing an image of the substrate and thinning the captured image of the substrate to provide the thinned image as an image of the substrate;
- wherein the thinning of the captured image comprises:
- displaying an area where the connection wires and the data pads are disposed as pixels having a first gradation with one brightness level and displaying an area where the connection wires and the data pads are not disposed as pixels having a second gradation lower than the first gradation with another brightness level.

11. The method of claim 8, further comprising: revise claims 11+ consistent with changes above—the client likes consistent changes in the claims to like text
- receiving the image of the display area;
- setting an inspection area in the display area;
- inspecting and determining a pixel period security by dividing the pixel units of the inspection area by a predetermined number unit;
- inspecting, when the pixel period security is determined, an interval between the pixel units of the pixel period;
- proceeding, when the pixel period security is not determined, to the dividing the inspection area and the setting of the inspection area;
- detecting, when the interval between the pixel units is the same, a defective pixel unit by comparing images of the pixel units; and
- proceeding, when the interval between the pixel units is different, to the dividing of the inspection area and the setting of the inspection area.

12. The method of claim 11, wherein the inspecting and determining of the pixel period security comprises:
- dividing the pixel units of the inspection area by a pixel period defined by a pixel number;
- determining, when the number of the pixel units is divided by the pixel period, it as the pixel period security; and
- not determining, when the number of the pixel units is not divided by the pixel period, it as the pixel period security.

* * * * *